(12) United States Patent
Ebrahimi et al.

(10) Patent No.: US 12,282,429 B2
(45) Date of Patent: Apr. 22, 2025

(54) SYSTEMS AND METHODS FOR ADAPTIVE HYBRID HARDWARE PRE-FETCH

(71) Applicant: Huawei Technologies Co., Ltd., Shenzhen (CN)

(72) Inventors: Elnaz Ebrahimi, San Jose, CA (US); Ehsan Khish Ardestani Zadeh, San Jose, CA (US); Wei-Yu Chen, Fremont, CA (US); Liang Peng, San Jose, CA (US)

(73) Assignee: Huawei Technologies Co., Ltd., Shenzhen (CN)

( * ) Notice: Subject to any disclaimer, the term of this patent is extended or adjusted under 35 U.S.C. 154(b) by 77 days.

(21) Appl. No.: 17/944,031

(22) Filed: Sep. 13, 2022

(65) Prior Publication Data

US 2023/0022190 A1    Jan. 26, 2023

Related U.S. Application Data

(63) Continuation of application No. PCT/US2020/040712, filed on Jul. 2, 2020.

(60) Provisional application No. 63/032,592, filed on May 30, 2020.

(51) Int. Cl.
*G06F 12/0862* (2016.01)
*G06F 12/0811* (2016.01)

(52) U.S. Cl.
CPC ...... *G06F 12/0862* (2013.01); *G06F 12/0811* (2013.01); *G06F 2212/6024* (2013.01)

(58) Field of Classification Search
None
See application file for complete search history.

(56) References Cited

U.S. PATENT DOCUMENTS

| | | | |
|---|---|---|---|
| 10,860,488 B1 * | 12/2020 | Kachmar | G06F 12/0888 |
| 2007/0094453 A1 * | 4/2007 | Santhanakrishnan | G06F 9/383 |
| | | | 712/E9.047 |
| 2011/0072218 A1 | 3/2011 | Manne et al. | |
| 2012/0066455 A1 * | 3/2012 | Punyamurtula | G06F 12/0862 |
| | | | 711/204 |

(Continued)

FOREIGN PATENT DOCUMENTS

CN    105955709 A  *  9/2016

OTHER PUBLICATIONS

Kondguli et al. "Division of Labor: A More Effective Approach to Prefetching." Jun. 2018. IEEE. ISCA 2018. pp. 83-95.*

(Continued)

*Primary Examiner* — Nathan Sadler
(74) *Attorney, Agent, or Firm* — Pearl Cohen Zedek Latzer Baratz LLP

(57) ABSTRACT

An apparatus includes a processor core and a memory hierarchy. The memory hierarchy includes main memory and one or more caches between the main memory and the processor core. A plurality of hardware pre-fetchers are coupled to the memory hierarchy and a pre-fetch control circuit is coupled to the plurality of hardware pre-fetchers. The pre-fetch control circuit is configured to compare changes in one or more cache performance metrics over two or more sampling intervals and control operation of the plurality of hardware pre-fetchers in response to a change in one or more performance metrics between at least a first sampling interval and a second sampling interval.

27 Claims, 10 Drawing Sheets

(56) References Cited

U.S. PATENT DOCUMENTS

| | | |
|---|---|---|
| 2013/0138887 A1 | 5/2013 | Chou |
| 2014/0258641 A1 | 9/2014 | Hooker et al. |
| 2015/0234663 A1* | 8/2015 | Chishti ............... G06F 9/3808 712/207 |
| 2017/0286304 A1* | 10/2017 | Peled ................ G06F 12/0897 |
| 2018/0157591 A1* | 6/2018 | Wilkerson .......... G06F 12/0862 |
| 2021/0011726 A1* | 1/2021 | Alam ................ G06F 9/30047 |

OTHER PUBLICATIONS

Translation of CN-105955709-A. 2023.*

Verma, Santhosh, et al., "A Hybrid Adaptive Feedback Based Prefetcher," Department of Electircal and Computer Engineering, Louisiana State University, Baton Rouge, LA, Computer Science, Jan. 2009, 5 pages.

Chen, Yong, et al., "An Adaptive Data Prefetcher for High-Performance Processors," 2010 10th IEEE/ACM International Conference on Cluster, Cloud and Grid Computing, May 2010, 10 pages.

Falsafi, Babak, et al., "A Primer on Hardware Prefetching," Synthesis Lectures Computer Architecture, Morgan & Claypool Publishers, Jun. 2014, 69 pages.

Ramos, Luis M., et al., "Multi-level Adaptive Prefetching based on Performance Gradient Tracking," Journal of Instruction-Level Parallelism, Jan. 2011, 14 pages.

Srinath, Santhosh, et al., "Feedback Directed Prefetching: Improving the Performance and Bandwidth-Efficienty of Hardware Prefetchers," 2007 IEEE 13th International Symposium on High Performance Computer Architecture, Feb. 2007, 12 pages.

International Preliminary Report on Patentability dated Dec. 6, 2022, International Application No. PCT/US2020/040712.

* cited by examiner

SYSTEMS AND METHODS FOR ADAPTIVE HYBRID HARDWARE PRE-FETCH

CROSS-REFERENCE TO RELATED APPLICATIONS

This application is a continuation of PCT Patent Application Number US2020/040712, filed on Jul. 2, 2020, which claims the benefit of U.S. Provisional Patent Application No. 63/032,592, filed on May 30, 2020.

FIELD

The disclosure generally relates to pre-fetching data in caches in computing systems.

BACKGROUND

A computing system may use a cache memory to improve computing performance. For instance, a computing system may store data that it needs to access more frequently in a smaller, faster cache memory instead of storing the data in a slower, larger memory (e.g., a main memory unit). Accordingly, the computing system is able to access the data quicker, which can reduce the latency of memory accesses.

A computing system may have a hierarchy of caches that are ordered in what are referred to herein as cache levels. Typically, the cache levels are numbered from a highest level cache to a lowest level cache. There may be two, three, four, or even more levels of cache in the cache hierarchy. Herein, a convention is used to refer to the highest-level cache with the lowest number, with progressively lower levels receiving progressively higher numbers. For example, the highest-level cache in the hierarchy may be referred to as cache level 1 (L1). Here, the lower level cache levels may be referred to as L2, L3, L4, etc. Cache level 1 (L1) is typically a small, fast cache near the processor. The lowest level cache is typically referred to as a last level cache (LLC).

When a processor needs data (referred to as target data), the processor typically requests the target data from the highest level cache (e.g., L1). If the target data is not in a cache, this is referred to as a cache miss. In the event of a cache miss, the next level cache is typically examined to determine if the target data is at the next level cache. This process is typically repeated until the highest level cache is searched for the target data. If none of the caches have the target data, then the target data is accessed from main memory.

BRIEF SUMMARY

According to one aspect of the present disclosure, there is provided an apparatus comprising a processor core, a memory hierarchy comprising main memory and one or more caches between the main memory and the processor core, and a plurality of hardware pre-fetchers coupled to the memory hierarchy. A pre-fetch control circuit coupled to the plurality of hardware pre-fetchers is configured to measure changes in one or more cache performance metrics over two or more sampling intervals and control operation of the plurality of hardware pre-fetchers in response to a change in one or more performance metrics between consecutive sampling intervals.

Optionally, in any of the preceding aspects, the change in the one or more performance metrics includes a change in pre-fetch accuracy between at least the first sampling interval and the second sampling interval.

Optionally, in any of the preceding aspects, the pre-fetch control circuit is configured to reduce aggressiveness of a hardware pre-fetcher in response to a reduction in pre-fetch accuracy from the first sampling interval to the second sampling interval.

Optionally, in any of the preceding aspects, the pre-fetch control circuit is further configured to control operation of the plurality of hardware pre-fetchers in response to a detected level of system utilization, the pre-fetch control circuit configured to reduce aggressiveness of the hardware pre-fetcher in response to high system utilization.

Optionally, in any of the preceding aspects, the pre-fetch control circuit is configured to reduce aggressiveness of the hardware pre-fetcher by reducing at least one of degree or distance used by the hardware pre-fetcher.

Optionally, in any of the preceding aspects, the plurality of hardware pre-fetchers includes a first hardware pre-fetcher, a second hardware pre-fetcher and a third hardware pre-fetcher, each connected to receive a separate control signal from the pre-fetch control circuit.

Optionally, in any of the preceding aspects, the first hardware pre-fetcher is a Multi-Offset Pre-fetcher (MOP), the second hardware pre-fetcher is a Spatial Memory Streaming (SMS) pre-fetcher, and the third hardware pre-fetcher is an Enhanced Next-line Pre-fetcher (ENP).

Optionally, in any of the preceding aspects, the first and second sampling intervals are each defined by a predetermined number of evictions in a corresponding cache.

Optionally, in any of the preceding aspects, the one or more caches between the main memory and the processor core include a Level 1 (L1) cache and a Level 2 (L2) cache, each of the plurality of hardware pre-fetchers operating separately on L1 cache and L2 cache according to separate performance metrics and separate sampling intervals.

According to one other aspect of the present disclosure, there is provided a method comprising operating a plurality of hardware pre-fetchers to pre-fetch data in a memory hierarchy that includes a main memory and one or more caches between the main memory and a processor core, calculating changes in one or more performance metrics over two or more sampling intervals, and controlling the plurality of hardware pre-fetchers in response to a change in the one or more performance metrics between at least a first sampling interval and a second sampling interval.

Optionally, in any of the preceding aspects, the change in the one or more performance metrics includes a change in pre-fetch accuracy between at least the first sampling interval and the second sampling interval.

Optionally, in any of the preceding aspects, controlling the plurality of hardware pre-fetchers in response to a change in the one or more performance metrics includes reducing aggressiveness of a hardware pre-fetcher in response to a reduction in pre-fetch accuracy from the first sampling interval to the second sampling interval.

Optionally, in any of the preceding aspects, the method further comprises controlling the plurality of hardware pre-fetchers in response to a detected level of system utilization including reducing aggressiveness of the hardware pre-fetcher in response to high system utilization.

Optionally, in any of the preceding aspects, reducing aggressiveness of the hardware pre-fetcher includes reducing at least one of degree or distance used by the hardware pre-fetcher.

Optionally, in any of the preceding aspects, the method further includes sending a first control signal to a first hardware pre-fetcher of the plurality of hardware pre-fetchers; sending a second control signal to a second hardware pre-fetcher of the plurality of hardware pre-fetchers; and sending a third control signal to a third hardware pre-fetcher of the plurality of hardware pre-fetchers.

Optionally, in any of the preceding aspects, the first hardware pre-fetcher is a Multi-Offset Pre-fetcher (MOP), the second hardware pre-fetcher is a Spatial Memory Streaming (SMS) pre-fetcher, and the third hardware pre-fetcher is an Enhanced Next-line Pre-fetcher (ENP).

Optionally, in any of the preceding aspects, the method further includes counting evictions from a cache of the memory hierarchy, the first and second sampling intervals defined by a predetermined number of evictions from the cache.

Optionally, in any of the preceding aspects, the one or more caches between the main memory and the processor core include a Level 1 (L1) cache and a Level 2 (L2) cache, and calculating changes in one or more performance metrics includes calculating a first change in a performance metric for the L1 cache and calculating a second change in the performance metric for the L2 cache.

According to still one other aspect of the present disclosure, there is provided a computer system, comprising a processor core; a memory hierarchy comprising main memory and at least a first cache and a second cache between the main memory and the processor core; a plurality of hardware pre-fetchers coupled to the memory hierarchy, the plurality of hardware pre-fetchers including at least a Multi-Offset Pre-fetcher (MOP), a Spatial Memory Streaming (SMS) pre-fetcher, and an Enhanced Next-line Pre-fetcher (ENP); and a pre-fetch control circuit coupled to the plurality of hardware pre-fetchers, the pre-fetch control circuit configured to compare changes in pre-fetch accuracy of the first cache and the second cache over two or more sampling intervals and control aggressiveness of the plurality of hardware pre-fetchers in response to changes in pre-fetch accuracy of a corresponding cache between at least a first sampling interval and a second sampling interval of the corresponding cache.

Optionally, in any of the preceding aspects, the pre-fetch control circuit is configured to reduce aggressiveness of a hardware pre-fetcher in response to a reduction in pre-fetch accuracy from the first sampling interval to the second sampling interval and to increase aggressiveness of the hardware pre-fetcher in response to an increase in pre-fetch accuracy of the hardware pre-fetcher from the first sampling interval to the second sampling interval.

Optionally, in any of the preceding aspects, the pre-fetch control circuit is further configured to control operation of the plurality of hardware pre-fetchers in response to a detected level of system utilization, the pre-fetch control circuit configured to reduce aggressiveness of the hardware pre-fetcher in response to high system utilization.

Optionally, in any of the preceding aspects, the pre-fetch control circuit is configured to reduce aggressiveness of the hardware pre-fetcher by reducing at least one of degree or distance used by the hardware pre-fetcher.

Optionally, in any of the preceding aspects, the first and second sampling intervals for the first cache are defined by a first predetermined number of evictions from the first cache and the first and second sampling intervals for the second cache are defined by a second predetermined number of evictions from the second cache.

According to still one other aspect of the present disclosure, there is provided a computer system, comprising a processor core; a main memory; a first level (L1) cache between the processor core and the main memory; a second level (L2) cache between the L1 cache and the main memory; a Multi-Offset hardware pre-fetcher coupled to the L1 cache and the L2 cache; a Spatial Memory Streaming hardware pre-fetcher coupled to the L2 cache; an Enhanced Next-line hardware pre-fetcher coupled to the L1 cache; and a pre-fetch control circuit coupled to the Multi-Offset hardware pre-fetcher, the Spatial Memory Streaming hardware pre-fetcher, and the Enhanced Next-line hardware pre-fetcher, the pre-fetch control circuit configured to: obtain pre-fetch accuracy metrics from the L1 cache and the L2 cache; change at least one of degree and distance of the Multi-Offset hardware pre-fetcher in at least one of the L1 cache and the L2 cache according to a change in pre-fetch accuracy between two sampling intervals of the L1 and L2 cache; change at least one of degree and distance of the Enhanced Next-line hardware pre-fetcher in the L1 cache according to a change in the pre-fetch accuracy between two sampling intervals of the L1 cache; and change at least one of degree and distance of the Spatial Memory Streaming hardware pre-fetcher in the L2 cache according to a change in the pre-fetch accuracy between two sampling intervals of the L2 cache.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

BRIEF DESCRIPTION OF THE DRAWINGS

Aspects of the present disclosure are illustrated by way of example and are not limited by the accompanying figures (FIGs) for which like references indicate elements.

DETAILED DESCRIPTION

The present disclosure will now be described with reference to the figures (FIGs), which in general relate to cache pre-fetching. Data may be cached and retrieved from cache in units of a memory block. A memory block is a basic unit of storage in a memory hierarchy. The memory block may also be referred to as a cache block or as a cache line. Herein, a "cache pre-fetch" is defined as a fetch of one or more memory block from its current location in a memory hierarchy into a cache at a higher level in the memory hierarchy prior to a demand from a processor core for the memory block. The term "pre-fetch" may be used herein instead of "cache pre-fetch" for brevity. The current location in the memory hierarchy refers to the highest level in the memory hierarchy at which the memory block currently resides (where higher means closer to a processor core and lower is further from a processor core).

Figure 1A:
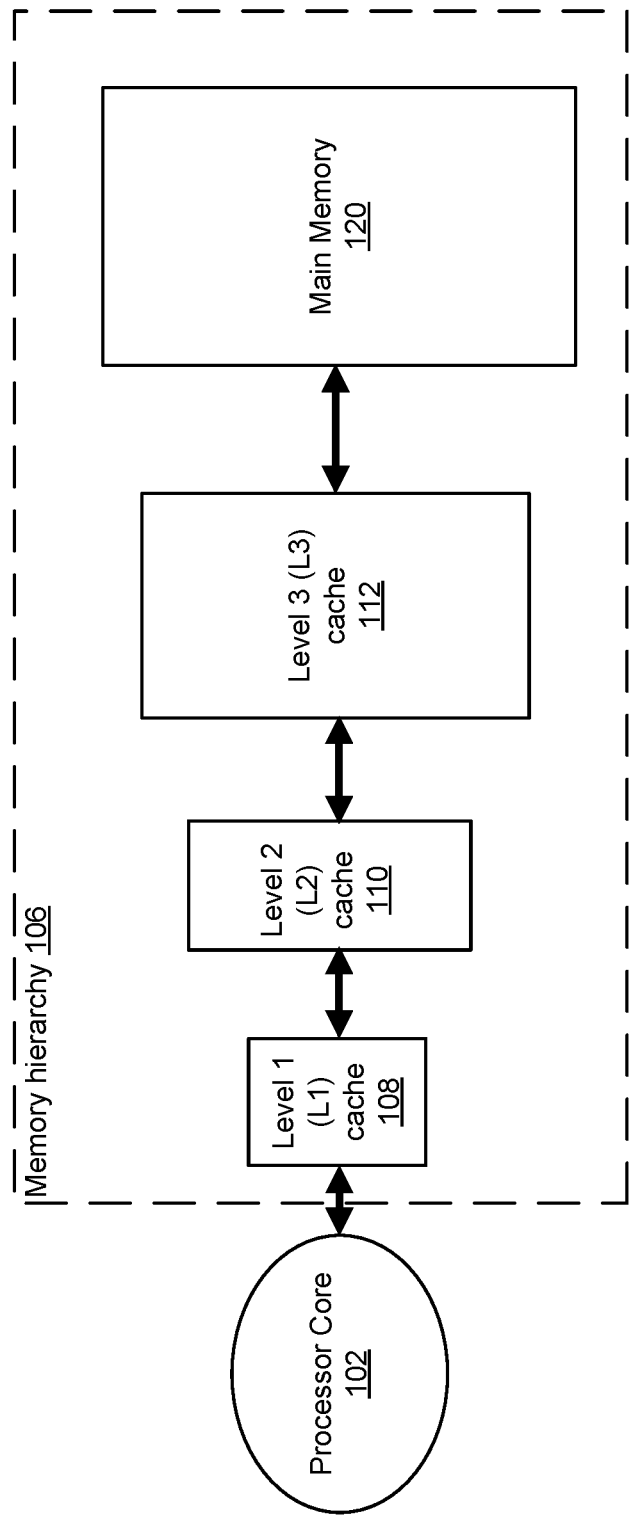
FIGS. 1A-C depict an example of a memory system.

FIG. 1A is a conceptual illustration of an example of a processor core 102 connected to a memory hierarchy 106. Memory hierarchy 106 includes three levels of cache, level 1 (L1) cache 108, level 2 (L2) cache 110, and level 3 (L3) cache 112 connected to main memory 120. Other cache configurations including different numbers of caches may be used (e.g. one or two caches, or more than three caches) in a memory hierarchy. In general, caches that are closer to a processor core are smaller and faster to access than caches that are closer to a main memory. For example, L1 cache 108 is smaller and faster than L2 cache 110, which is smaller and faster than L3 cache 112, which is smaller and faster than main memory 120. Any cache in a memory hierarchy such as memory hierarchy 106 may hold pre-fetched data. Different criteria may be applied for pre-fetching in different caches.

A cache pre-fetcher may pre-fetch data or instructions. Data pre-fetch may predict data for future address requests by observing load and store traffic of load and store instructions and bringing the data closer to the core ahead of its future demands.

Hardware data prefetching may be made based on a likelihood that there will be an upcoming demand or need for the memory address from a processor core. If a request for the memory block is received, the memory block can be accessed much faster from the cache than if the memory block were still in main memory, or at a lower level of the memory hierarchy. However, it is possible that a pre-fetched memory block will not be demanded by the processor core, which means that the space in the higher-level cache is not used efficiently. Pre-fetching the memory block may result in an eviction of a victim memory block from cache storage. If there is a demand for the victim memory block but not for the pre-fetched memory block, performance may be degraded. Also, the pre-fetch requests use bandwidth in the memory hierarchy. Hence, the pre-fetch requests that do not lead to a demand for a pre-fetched memory block may waste resources including cache capacity and bandwidth in the memory hierarchy and may impact performance of a memory system.

Aspects of the present technology use multiple hardware pre-fetchers to pre-fetch data in a memory hierarchy. Different hardware pre-fetchers may be configured to apply different pre-fetching schemes so that the benefits of multiple schemes may be obtained. The hardware pre-fetchers may be controlled according to changing performance metrics of the caches in the memory hierarchy so that pre-fetching adapts dynamically. For example, a performance metric such as pre-fetch accuracy in a cache may be obtained over multiple sampling intervals and the change in the performance metric from one sampling interval to the next sampling interval may be used to determine how pre-fetching may be changed (e.g. whether to increase or decrease aggressiveness). Where a change in a performance metric indicates an improvement in pre-fetch performance (e.g. an increase in pre-fetch accuracy), one or more hardware pre-fetchers may be controlled to increase aggressiveness (e.g. increase degree and/or distance) and when a change in a performance metric indicates a decrease in pre-fetching performance (e.g. a decrease in pre-fetch accuracy), one or more hardware pre-fetchers may be controlled to decrease aggressiveness (e.g. decrease degree and/or distance). Pre-fetchers may also be controlled according to system utilization (system pressure) so that pre-fetching does not use excessive resources (e.g. by throttling pre-fetching when system utilization is high). A suitable pre-fetch control circuit may control multiple hardware pre-fetchers that operate in parallel so that pre-fetching adapts dynamically to changing patterns of access to memory while ensuring that pre-fetching is not excessive.

It is understood that the present embodiments of the disclosure may be implemented in many different forms and that claim scope should not be construed as being limited to the embodiments set forth herein. Rather, these embodiments are provided so that this disclosure will be thorough and complete and will fully convey the inventive embodiment concepts to those skilled in the art. Indeed, the disclosure is intended to cover alternatives, modifications, and equivalents of these embodiments, which are included within the scope and spirit of the disclosure as defined by the appended claims. Furthermore, in the following detailed description of the present embodiments of the disclosure, numerous specific details are set forth in order to provide a thorough understanding. However, it will be clear to those of ordinary skill in the art that the present embodiments of the disclosure may be practiced without such specific details.

Figure 1B:
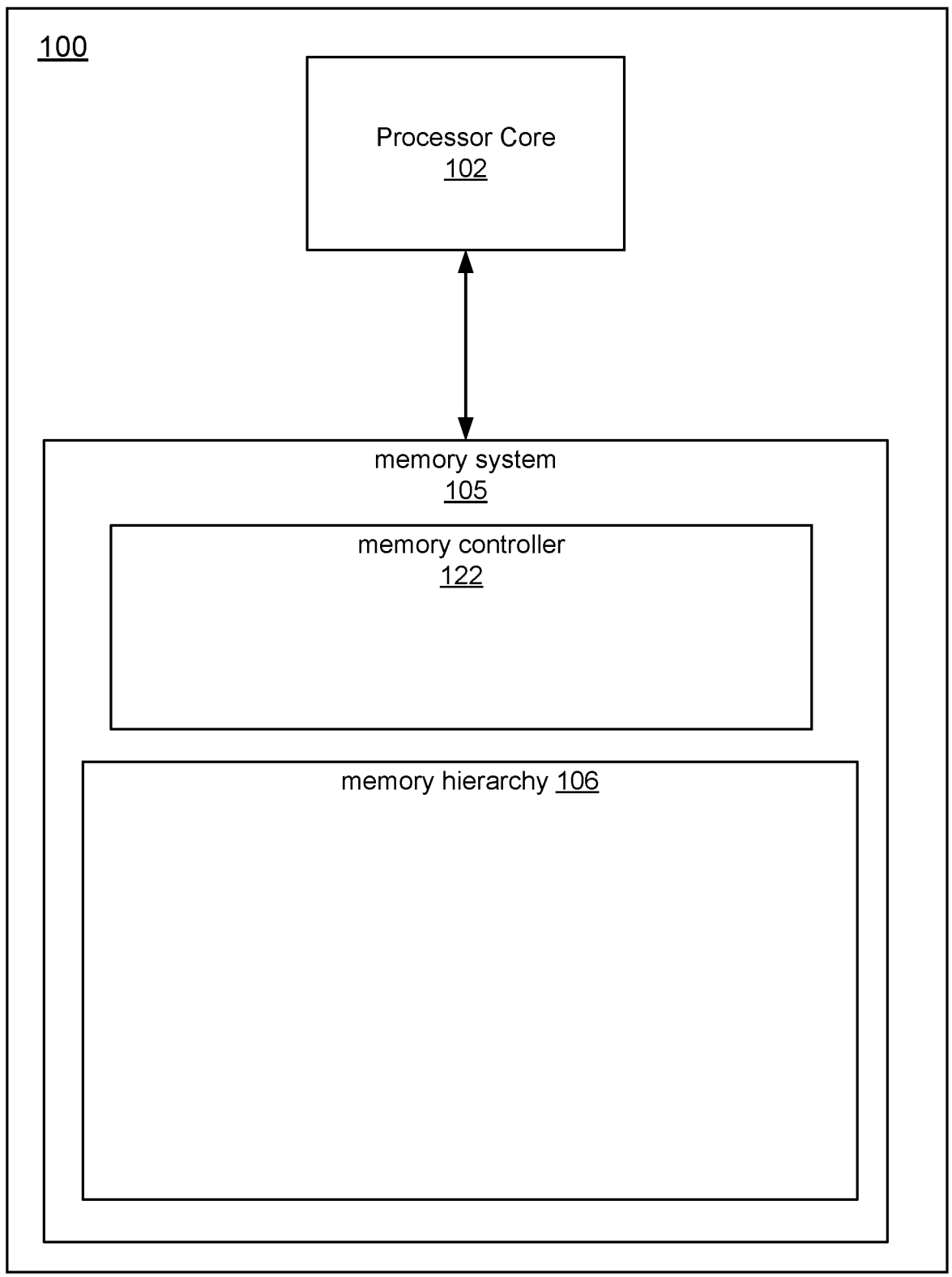

FIG. 1B depicts one embodiment of a system (or apparatus) 100 that includes a memory system 105 coupled to processor core 102. Memory system 105 includes memory hierarchy 106 and memory controller 122. Processor core 102 may also be referred to as a central processing unit (CPU). Memory hierarchy 106 may store data and/or program instructions, which are provided to processor core 102 in response to a demand or request from processor core 102, which may execute the program instructions obtained from memory hierarchy 106. A "program instruction" may be defined as an instruction that is executable on a processor (e.g., microprocessor or CPU). A processor core 102 may have a program counter (PC) that contains a value that uniquely defines the program instruction. For example, during sequential execution of program instructions, the program counter may be incremented by one with execution of each program instruction. As is well understood by those of ordinary skill in the art, it is possible for the program instructions to be executed non-sequentially, such as with branch instructions. Thus, the value in the program counter could be increased or decreased by more than one.

Memory hierarchy 106 may include a main memory and one or more caches (e.g. as previously illustrated in FIG. 1A). Memory controller 122 includes control circuits configured to transfer data between processor core 102 and memory hierarchy 106 (e.g. perform read/write, load/store, or other memory access operations) and to operate memory hierarchy 106, including pre-fetching data in memory hierarchy 106. Memory controller 122 may be implemented as dedicated control circuits (e.g. in an Application Specific Control Circuit or ASIC), programmable logic circuits, using a processor configured by firmware to perform memory controller functions, or otherwise.

Figure 1C:
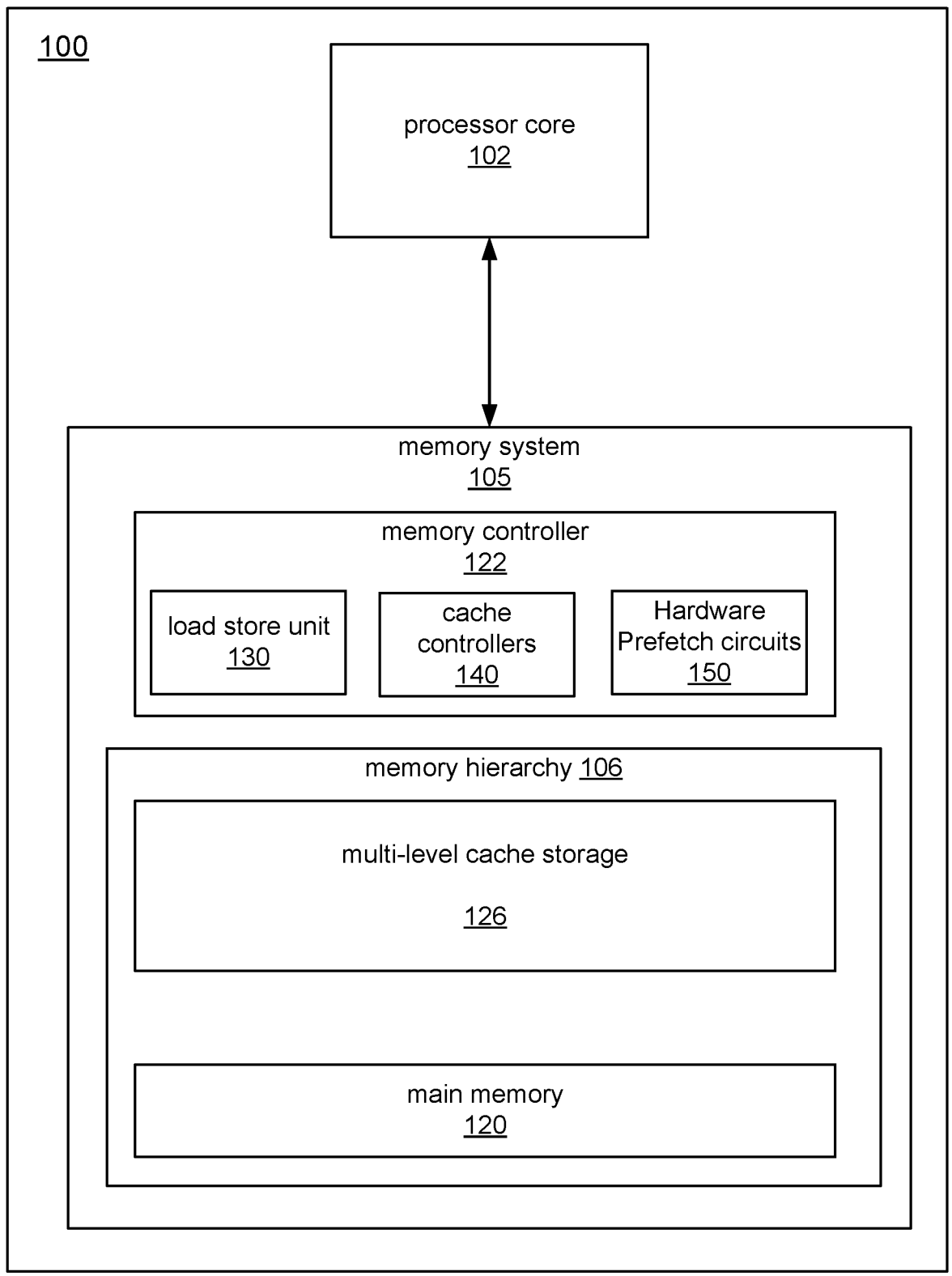

FIG. 1C illustrates schematically an implementation of system 100 showing additional detail of memory system 105 in this embodiment (note that the locations of boxes in this schematic do not necessarily correspond to their physical locations when embodied in circuits). Memory system 105 includes multi-level cache storage 126, main memory 120, and a memory controller 122. The multi-level cache storage 126 includes multiple cache levels. For example, the multi-level cache storage 126 may include level 1 (L1) cache, level 2 (L2) cache, and last level cache (LLC). The memory controller 122 is configured to control access to multi-level cache storage 126 and the main memory 120. The load store unit 130 is responsible for executing all load and store instructions. A load store unit may be implemented in a processor core or externally (e.g. in a memory system as shown by load store 130) or some combination (e.g. partially implemented in a processor core and partially implemented by components outside the processor core). The present technology is not limited to any particular load store location or configuration. The load store unit 130 provides data transfer between storage in the memory hierarchy 106 (e.g., multi-level cache storage 126, main memory 120) and registers in the processor core 102). Hardware prefetch circuits 150 may observe this traffic between load store unit 130 and processor core 102 and may use it for training of one or more hardware prefetcher. In one embodiment, there is a cache controller for each cache level. Each cache controller may be responsible for managing a cache in the multi-level cache storage 126. For example, when a cache controller receives a request for a cache line, it checks the address of the cache line to determine whether the cache line is in the cache. If the cache line is in the cache, cache line may be read from the cache. If the cache line is not in the cache (referred to as a cache miss), the cache controller sends a request to a lower level cache (i.e., a cache closer to main memory 120), or to main memory if there is not a cache closer to main memory 120. Cache controllers may be implemented using dedicated hardware, using one or more processors configured by firmware, or a combination of dedicated hardware and firmware.

In one embodiment, the processor core 102 sends demands (requests) to the memory hierarchy 106 for target memory blocks. These demands may occur in response to the processor core 102 executing a program instruction such as, but not limited to, a load instruction. In one embodiment, the demands are sent to the load store unit (LSU) 130. Progressively lower levels of the multi-level cache storage 126 may be searched for the target memory block. If the target memory block is not found at any level of the multi-level cache storage 126, then the main memory 120 is searched. If the target memory block is not found in the memory hierarchy 106, another memory such as a solid state drive (or hard disk drive) may be searched for the target memory block. The amount of time it takes to provide the memory block to the processor core 102 increases greatly with each further level that is searched. In one embodiment, the target memory block, once located, is cached at a highest level of the multi-level cache storage 126 (such as an L1 cache) because, in general, a memory block demanded by the processor core 102 may be demanded again in the near future. However, due to the limited space in the highest level cache, if there is no available space in the highest level cache for the target memory block, an existing memory block is chosen as a "victim" and is then evicted out of the highest level cache to make a room for the target memory block. In one embodiment, the process of evicting and replacing the victim memory block and the caching of the target memory block is based on a replacement algorithm. In some cases, the memory block is pre-fetched to a level other than the highest level, such as an L2 cache. If the target memory block is found in multi-level cache storage 126, the processor core 102 experiences a smaller delay than if the target memory block is in the main memory 120. If the target memory block is in a cache level that is very close to the processor core 102, the delay may be only one cycle execution time.

Hardware pre-fetch circuits 150 are configured to implement pre-fetching of data. Hardware pre-fetch circuits may be implemented in a processor core or outside a processor core (e.g. hardware prefetch circuits 150) or some combination (e.g. partially implemented in a processor core and partially implemented by components outside the processor core). The present technology is not limited to any particular location or configuration of hardware prefetch circuits. In some embodiments, hardware pre-fetch circuits comprise control logic, arithmetic logic, and storage. The arithmetic logic may be used for operations such as determining a next pre-fetch address. The storage may be used to store one or more statistics about pre-fetch requests. The control logic may be used to track statistics, store and access statistics from the storage, as well as to control the arithmetic logic. The hardware pre-fetch circuits 150 include hardware pre-fetchers that are implemented in hardware and may include additional control circuits associated with the hardware pre-fetchers that may be implemented in hardware or firmware. In one embodiment, hardware pre-fetch circuits 150 include multiple hardware pre-fetchers. In one embodiment, hardware pre-fetch circuits are implemented using discrete circuitry. For example, hardware pre-fetch circuits may be implemented using discrete logic, which may include but is not limited to NAND gates and/or NOR gates. Hardware pre-fetch circuits 150 may significantly reduce delays in providing target memory blocks by pre-fetching memory blocks. Pre-fetches are in addition to the demands for memory blocks made by the processor core 102. While FIG. 1C shows hardware pre-fetch circuits 150 as separate to LSU 130, in some examples, some portion of hardware pre-fetch circuits may be implemented in LSU 130, and/or other components of memory controller 122 and data used by hardware pre-fetch circuits 150 may be stored in multi-level cache storage (e.g. one or more tables may be stored in cache).

Each pre-fetch request associated with a given program instruction at one point in time is for a different memory block. As one example, if a request is received from processor core 102 for a memory block at memory address X, then hardware pre-fetch circuits 150 might issue pre-fetch requests for memory blocks at memory addresses X+α. The term α may be any integer (positive or negative) and may be referred to as a stride or offset (two or more such offsets may be used in a Multiple Offset Pre-fetcher, or MOP). In this example, there is a likelihood that subsequent requests will be for the subsequent memory blocks as indicated by these memory addresses. The number of such pre-fetch requests that are issued by the pre-fetch logic 104 is referred to as the degree of pre-fetch (or "pre-fetch degree"). Pre-fetching generally pre-fetches data with an address ahead of a current address and the distance refers to the number of addresses between the address of the pre-fetched data and the current address (i.e. how far ahead pre-fetching is performed). The term "aggressiveness" may be used to refer to how a cache operates in terms of parameters such as degree and/or distance. Increasing aggressiveness may refer to increasing degree and/or distance. Reducing aggressiveness may refer to reducing degree and/or distance. Controlling aggressiveness may refer to controlling degree and/or distance.

Figure 2:
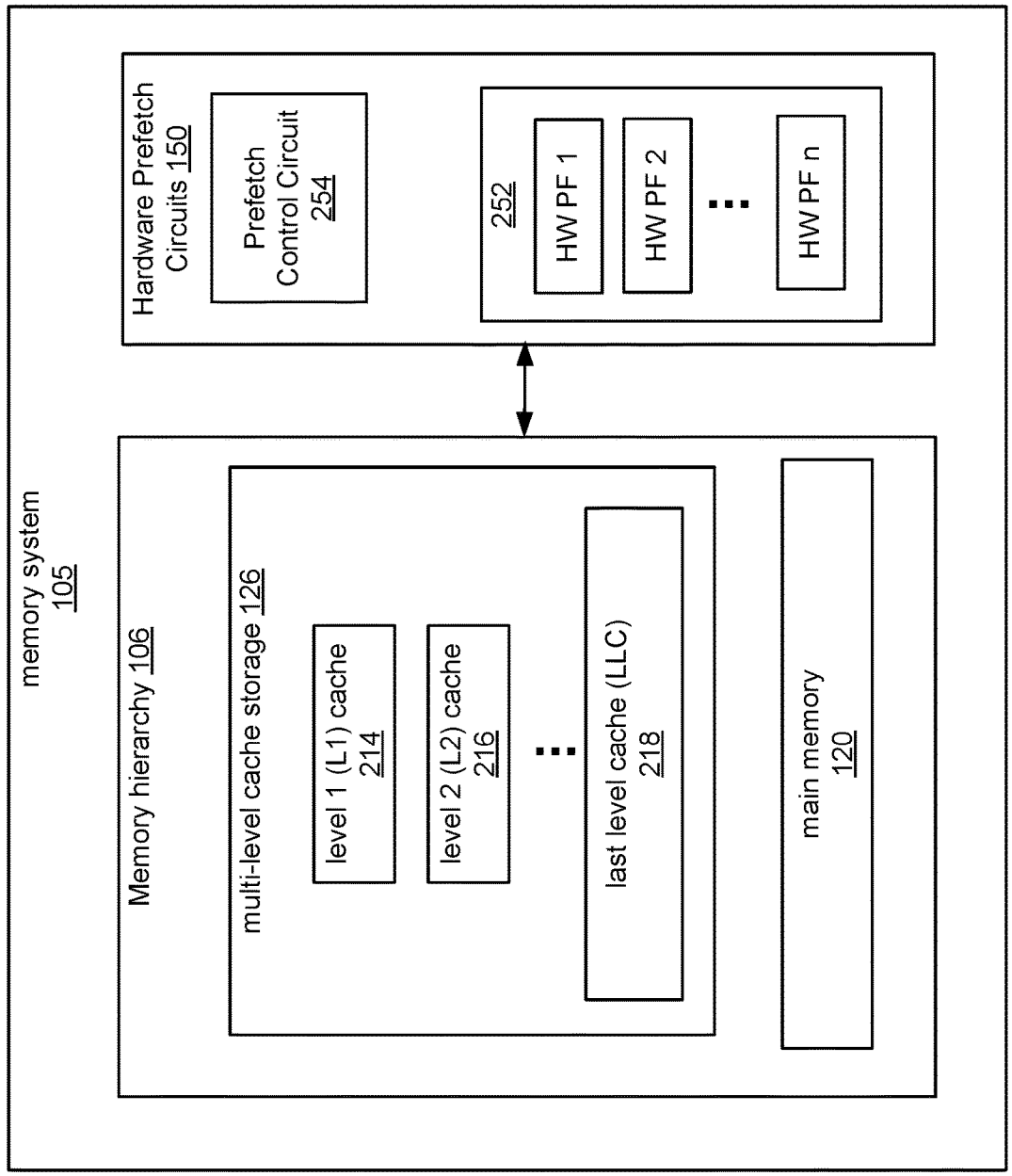
FIG. 2 depicts one embodiment of a memory system with hardware pre-fetch circuits.

FIG. 2 illustrates certain components of memory system 105 associated with pre-fetching according to an embodiment. FIG. 2 shows multi-level cache storage 126 including a plurality of caches including level 1 (L1) cache 214, level 2 (L2) cache 216, last level cache (LLC) 218, and main memory 120. There may be other levels of cache. For example, there may be additional cache(s) between the level 2 cache 216 and the LLC 218. In one embodiment, the L1 cache 214 is divided into an instruction cache for caching program instructions, and a data cache for caching program data.

In one embodiment, the level 1 cache 214 is on the same semiconductor die (e.g., chip) as processor core 102. In one embodiment, both the level 1 cache 214 and the level 2 cache are on the same semiconductor die (e.g., chip) as the processor core 102. A cache that is on the same semiconductor die (e.g., chip) as the processor core 102 may be referred to as internal cache. Alternatively, the L2 cache 216 could be external to the semiconductor die that contains the processor core 102.

In one embodiment, the LLC 218 is an external cache, by which it is meant that the cache is external to the semiconductor die that contains the processor core 102. In one embodiment, the LLC 218 is implemented using eDRAM. There may be more than one external cache. For example, there could be a level 3 (L3) and a level 4 (L4) cache.

Some, or all, of the caches may be private caches, by which it is meant that the caches are only accessible by the processor core 102. In one embodiment, the L1 cache 214 is a private cache. In one embodiment, both the L1 cache 214 and the L2 cache 216 are private caches. The LLC 218 could in some cases be private cache. Alternatively, some, or all, of the caches may be shared caches, by which it is meant that the caches are shared by the processor core 102 and another processor core. For example, the LLC 218 could be a shared cache.

The cache controllers 140 depicted in FIG. 1C may contain separate cache controllers that are each configured to control different levels in multi-level cache storage 126. For example, cache controllers 140 may include an L1 cache controller, an L2 cache controller, an LLC cache controller, and a main memory controller. Thus, the cache controllers 140 may contain separate cache controllers that are distributed across the multi-level cache storage 126. Portions of the memory controller 122 may be located on the same semiconductor die that contains the processor core 102, whereas other portions of the memory controller 122 may be external to the semiconductor die that contains the processor core 102. For example, the load store unit 130 unit may be located on the semiconductor die that contains the processor core 102, whereas an LLC cache controller might be external to the semiconductor die. Similarly, hardware pre-fetch circuits 150 may be located on the same semiconductor die that contains the processor core 102, external to the semiconductor die that contains the processor core 102, or some combination of on-chip and external circuits.

FIG. 2 shows hardware pre-fetch circuits 150 including hardware pre-fetchers 252, which includes n hardware pre-fetchers: hardware pre-fetcher 1 (HWPF 1), hardware pre-fetcher 2 (HWPF 2) . . . hardware pre-fetcher n (HWPF n), where n may be any number greater than 2. Each of hardware pre-fetchers HWPF 1 to n may apply a different pre-fetching scheme that may be adapted to different patterns of access by a processor core and may have different levels of accuracy at different times. By applying such different hardware pre-fetchers in a dynamic manner to multi-level cache storage 126, advantages of different pre-fetching schemes may be combined, and overall memory system performance may be enhanced.

Hardware pre-fetch circuits 150 include pre-fetch control circuit 254, which may control hardware pre-fetchers 252 to implement pre-fetching in a manner that achieves high performance (e.g. by achieving a high cache hit rate without excessive use of memory system resources). Hardware pre-fetch circuits 150 are connected to memory hierarchy 106 and may receive information regarding memory hierarchy 106, including information about caches of multi-level cache storage 126 (e.g. performance metrics relating to caching), which may be used to change pre-fetching implemented by hardware pre-fetchers 252 dynamically according to different conditions in multi-level cache storage 126.

Figure 3:
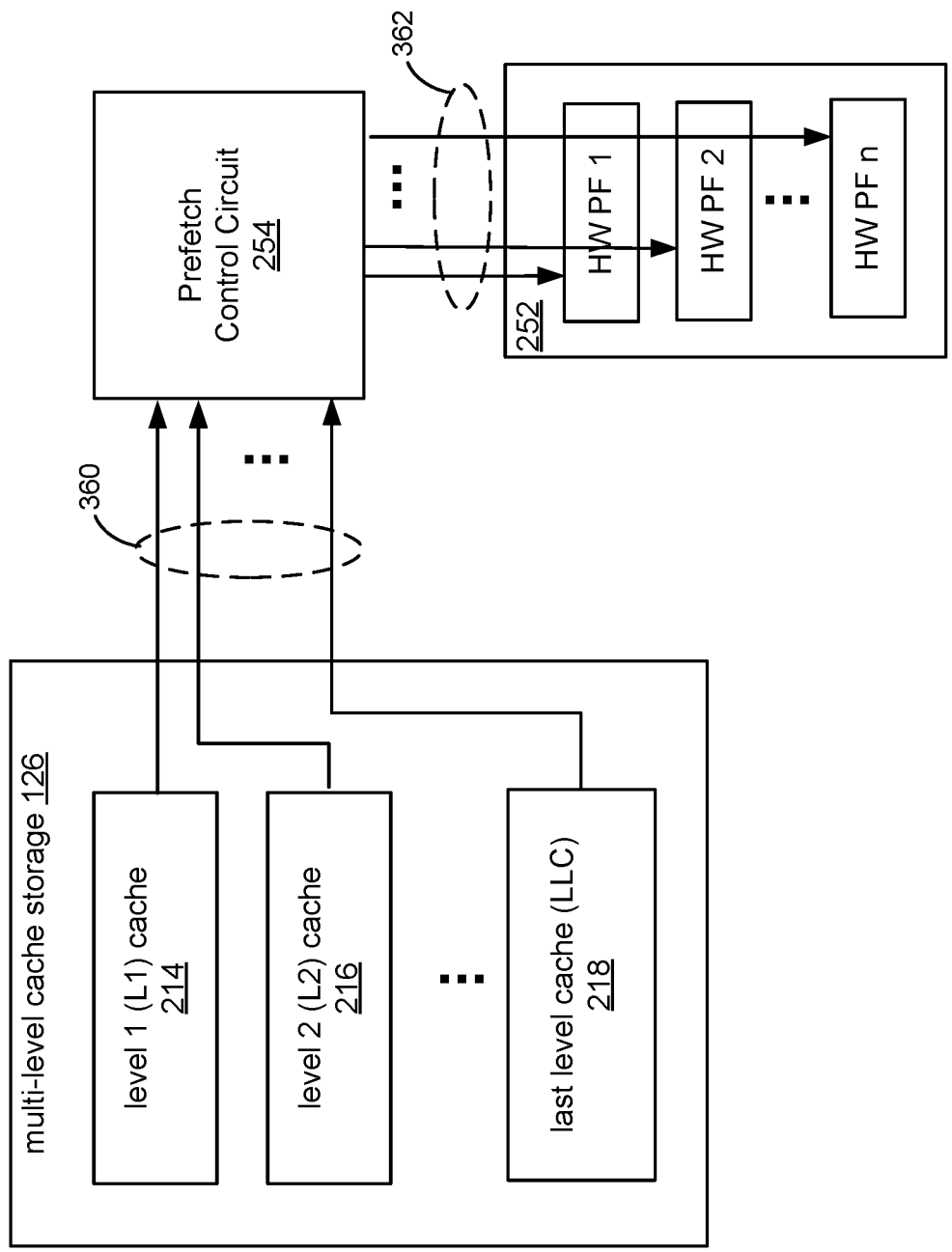
FIG. 3 depicts one embodiment that includes a pre-fetch control circuit and hardware pre-fetchers connected to multi-level cache storage.

FIG. 3 illustrates an example of a plurality of signals 360 from caches 214, 216, 218 of multi-level cache storage 126 sent to pre-fetch control circuit 254. Additional signals may be sent from any additional caches in multi-level cache storage 126. Signals 360 may convey information regarding conditions in multi-level cache storage 126. For example, cache performance metrics such as pre-fetch accuracy, or numbers from which pre-fetch accuracy may be calculated (e.g. number of pre-fetches sent and number of good pre-fetches) may be sent for one or more cache in multi-level cache storage 126. Additional metrics may reflect system utilization or pressure.

In an embodiment, performance metrics may be generated based on sampling intervals. For example, a value may be generated once per sampling interval to reflect a particular performance metric for that interval. A performance metric value may be sent to pre-fetch control circuit 254 every sampling interval from a cache in multi-level cache storage 126. Each cache in multi-level cache storage 126 may operate according to its own sampling intervals and sampling intervals may be different for different caches. For example, a sampling interval for L1 cache 214 may be different to a sampling interval for L2 cache 216. In an example, sampling intervals of a cache are defined by a predetermined number of evictions from the cache and different predetermined numbers may be used for different caches (e.g. to reflect different cache capacities). For example, a sampling interval for L2 cache may extend for a period in which a relatively large number of evictions occur (e.g. about 500 evictions) while a sampling interval for L1 cache may extend for a period in which a relatively small number of evictions occur (e.g. less than 100 evictions). An eviction count may be maintained for each cache in multi-level cache storage 126 and may be used to identify the end of a sampling interval (e.g. when the eviction count reaches a predetermined value, the sampling interval ends).

Pre-fetch control circuit 254 may use the performance metrics received from multi-level cache storage 126 to identify appropriate changes in pre-fetching and to generate control signals 362 accordingly. Control signals 362 are sent by pre-fetch control circuit 254 to hardware pre-fetchers 252. Each hardware pre-fetcher may receive a separate control signal that may convey different changes to be implemented by a corresponding hardware pre-fetcher. For example, aggressiveness of each hardware pre-fetcher may be separately controlled by a corresponding control signal. In an example, pre-fetch control circuit indicates degree and distance to a hardware pre-fetcher to cause it to adjust these pre-fetch parameters and thus adapt to changing conditions.

Figure 4:
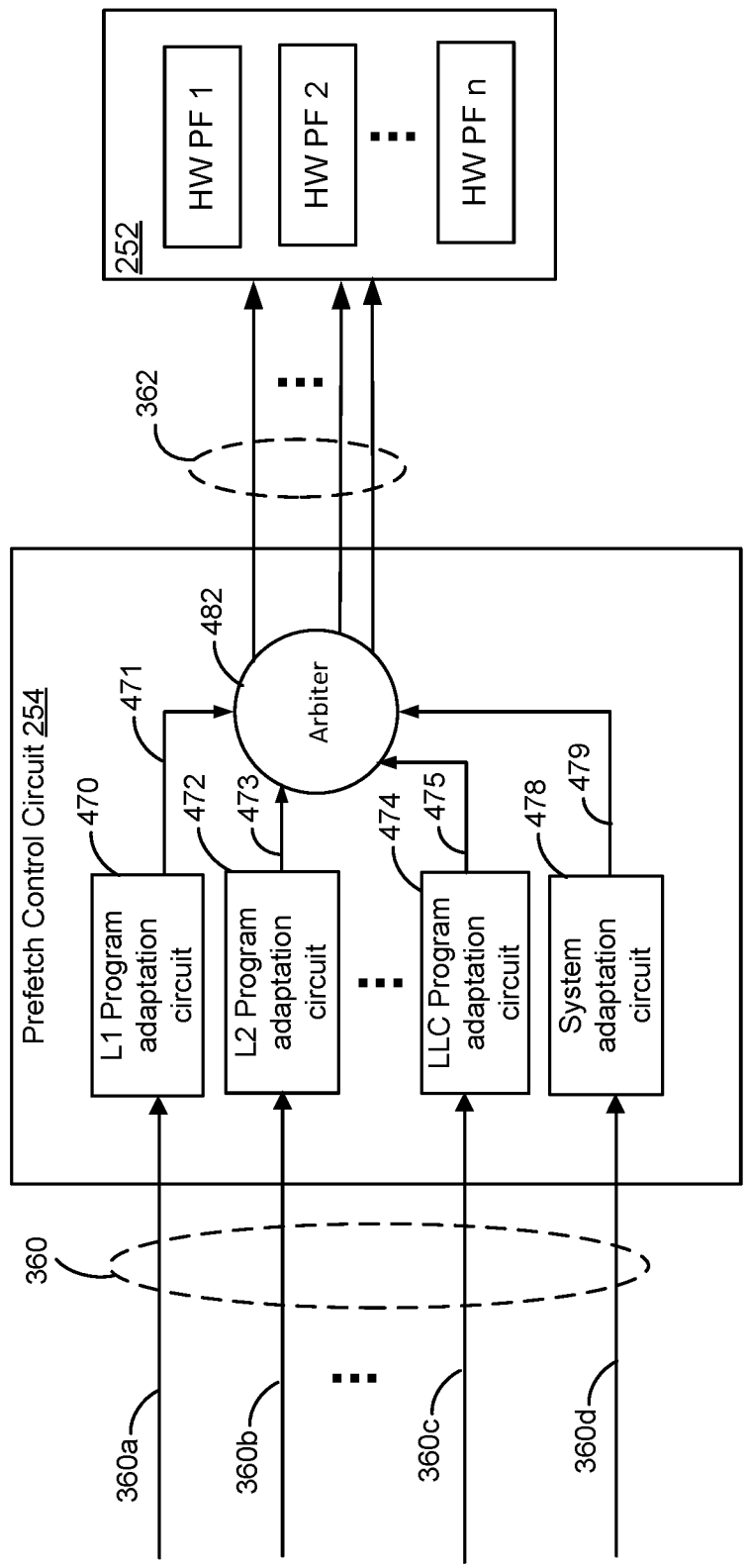
FIG. 4 depicts one embodiment of a pre-fetch control circuit.

FIG. 4 shows an example implementation of pre-fetch control circuit 254 configured to generate control signals 362, which control hardware pre-fetchers 252. Pre-fetch control circuit 254 includes L1 program adaptation circuit 470 connected to receive signal 360a from L1 cache 214 including one or more performance metrics for L1 cache 214. For example, signal 360a may indicate a value for pre-fetch accuracy, or values from which pre-fetch accuracy may be calculated (e.g. number of pre-fetches sent and number of good pre-fetches) for every sample interval of L1 cache 214. Signal 360a may include other performance metrics such as coverage, lateness, pre-fetch-induced cache pollution instead of, or in addition to pre-fetch accuracy. L1 program adaptation circuit 470 is configured to determine appropriate changes to pre-fetching based on data from L1 cache 214 provided by signal 360*a*. For example, L1 program adaptation circuit 470 may be configured to receive pre-fetch accuracy values for successive sample intervals of L1 cache 214 and to compare such values to calculate any change in pre-fetch accuracy (e.g. to calculate accuracy gain by calculating the difference between pre-fetch accuracy in a first sample interval and pre-fetch accuracy in a second sample interval). Thus, a current pre-fetch accuracy value may be compared with a prior pre-fetch accuracy to calculate a value that quantifies change in pre-fetch accuracy between successive sample intervals for L1 cache. Other performance metrics may be similarly compared from sample interval to sample interval to provide a dynamic metric for pre-fetching. Changes in performance metrics between sample periods may be used to identify appropriate changes in pre-fetching schemes to be applied by hardware pre-fetchers. For example, a table or other stored relationship may be used to identify an appropriate change in pre-fetching parameters according to a change in one or more performance metrics, which may then be included in an output signal 471.

Pre-fetch control circuit 254 includes L2 program adaptation circuit 472 connected to receive signal 360*b* from L2 cache 216 including one or more performance metrics for L2 cache 216. For example, signal 360*b* may indicate a value for pre-fetch accuracy, or values from which pre-fetch accuracy may be calculated (e.g. number of pre-fetches sent and number of good pre-fetches) for every sample interval of L2 cache 216. Signal 360*b* may include other performance metrics such as coverage, lateness, pre-fetch-induced cache pollution instead of, or in addition to pre-fetch accuracy. L2 program adaptation circuit 472 is configured to determine appropriate changes to pre-fetching based on data from L2 cache 216 provided by signal 360*b*. For example, L2 program adaptation circuit 472 may be configured to receive pre-fetch accuracy values for successive sample intervals of L2 cache 216 and to compare such values to calculate any change in pre-fetch accuracy (e.g. calculate accuracy gain). Thus, a current pre-fetch accuracy value may be compared with a prior pre-fetch accuracy to calculate a value that quantifies change in pre-fetch accuracy between successive sample intervals for L2 cache. Other performance metrics may be similarly compared from sample interval to sample interval to provide a dynamic indicator of pre-fetching success. Changes in performance metrics between sample periods may be used to identify appropriate changes in pre-fetching schemes to be applied by hardware pre-fetchers. For example, a table or other stored relationship may be used to identify an appropriate change in pre-fetching parameters according to change in one or more performance metrics, which may then be included in an output signal 473.

Pre-fetch control circuit 254 includes LLC (last level cache) program adaptation circuit 474 connected to receive signal 360*c* from LLC 218 including one or more performance metrics for LLC 218. For example, signal 360*c* may indicate a value for pre-fetch accuracy, or values from which pre-fetch accuracy may be calculated (e.g. number of pre-fetches sent and number of good pre-fetches) for every sample interval of LLC 218. Signal 360*c* may include other performance metrics such as coverage, lateness, pre-fetch-induced cache pollution instead of, or in addition to pre-fetch accuracy. LLC program adaptation circuit 474 is configured to determine appropriate changes to pre-fetching based on data from LLC 218 provided by signal 360*c*. For example, LLC program adaptation circuit 474 may be configured to receive pre-fetch accuracy values for successive sample intervals of LLC 218 and to compare such values to calculate any change in pre-fetch accuracy (e.g. calculate accuracy gain). Thus, a current pre-fetch accuracy value may be compared with a prior pre-fetch accuracy to calculate a value that quantifies change in pre-fetch accuracy between successive sample intervals for LLC cache. Other performance metrics may be similarly compared from sample interval to sample interval to provide a dynamic indicator of pre-fetching success. Changes in performance metrics between sample periods may be used to identify appropriate changes in pre-fetching schemes to be applied by hardware pre-fetchers. For example, a table or other stored relationship may be used to identify an appropriate change in pre-fetching parameters according to change in one or more performance metrics, which may then be included in an output signal 475. Where additional caches are provided between L2 cache 216 and LLC 218, corresponding additional program adaptation circuits are provided to receive performance metrics from such additional caches and to generate corresponding output signals to indicate appropriate changes to pre-fetching parameters.

Pre-fetch control circuit 254 includes system adaptation circuit 478 connected to receive signal 360*d* from multi-level cache storage 126 including one or more performance metrics indicating utilization of resources of multi-level cache storage 126. For example, signal 360*d* may indicate one or more values relating to system utilization. Such values may include occupancy of one or more caches and/or buffers, traffic on one or more busses between components of multi-level cache storage, or utilization of other resources in multi-level cache storage 126 including traffic between multi-level cache storage 126 and main memory 120 (e.g. as indicated by a controller, such as a DDR controller controlling a bus between main memory 120 and multi-level cache storage 126). System adaptation circuit 478 is configured to determine appropriate changes in pre-fetching schemes to be applied by hardware pre-fetchers based on the values relating to system utilization (e.g. if system utilization is high, less aggressive pre-fetching may be appropriate). For example, a table or other stored relationship may be used to identify an appropriate change in pre-fetching parameters according to one or more system utilization values. These changes may then be included in an output signal 479.

Output signals 471, 473, 475, and 479 are provided to arbiter 482, which arbitrates between different changes indicated by different ones of output signals 471, 473, 475, and 479 to determine appropriate changes for hardware pre-fetchers 252 and generate control signals 362 accordingly. For example, arbiter 482 may arbitrate between different changes indicated by system adaptation circuit 478 (e.g. based on system utilization) and changes indicated by one or more program adaptation circuit (e.g. based on pre-fetch accuracy).

Figure 5:
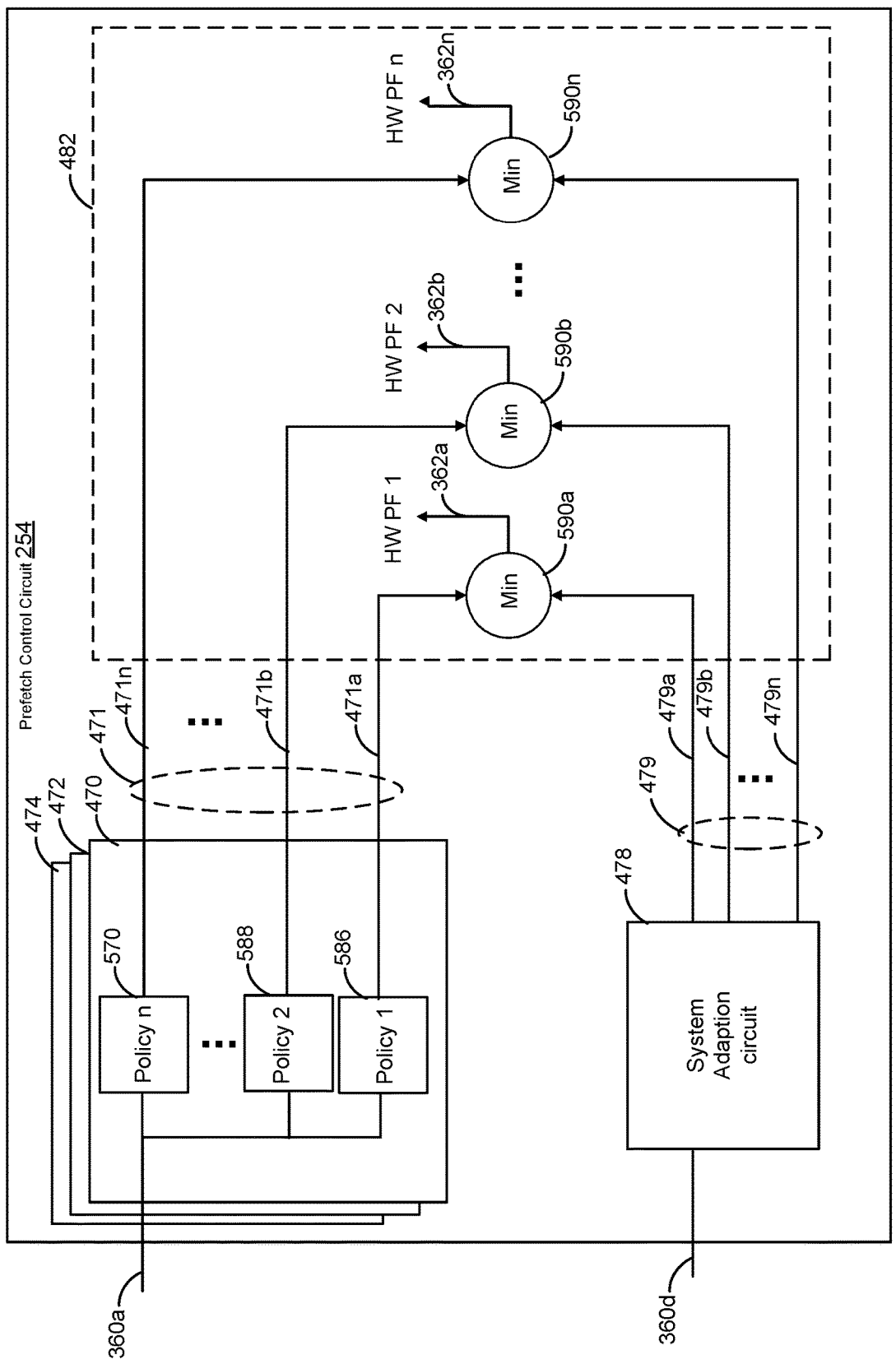
FIG. 5 depicts one embodiment of a pre-fetch control circuit that includes program adaptation circuits and a system adaptation circuit.

FIG. 5 illustrates an example implementation of a pre-fetch control circuit 254 including a program adaptation circuit (L1 program adaptation circuit 470) and system adaptation circuit 478. Other program adaptation circuits (e.g. L2 program adaptation circuit 472 and LLC program adaptation circuit 474) may be configured similarly to L1 program adaptation circuit 470 and are not shown in detail in FIG. 5.

L1 program adaptation circuit 470 is connected to receive signal 360*a* from L1 cache 214 including one or more performance metrics for L1 cache 214. Signal 360*a* may indicate a value for pre-fetch accuracy, or values from which pre-fetch accuracy may be calculated (e.g. number of pre-fetches sent and number of good pre-fetches) for every sample interval of L1 cache 214 and/or other performance metrics such as coverage, lateness, pre-fetch-induced cache pollution instead of, or in addition to pre-fetch accuracy. Different hardware pre-fetchers (e.g. hardware pre-fetchers HWPF 1 to HWPF n) operate on L1 cache 214 according to different pre-fetching schemes and L1 program adaptation circuit 470 includes policy setting circuits for each such hardware pre-fetcher. Policy 1 setting circuit 586 sets a policy for corresponding hardware pre-fetcher HWPF 1 (e.g. setting a policy of increased pre-fetch aggressiveness by increasing distance and/or degree). Policy 2 setting circuit 588 sets a policy for corresponding hardware pre-fetcher HWPF 2 (e.g. setting a policy of increased pre-fetch aggressiveness by increasing distance and/or degree). Policy n setting circuit 570 sets a policy for corresponding hardware pre-fetcher HWPF n (e.g. setting a policy of increased pre-fetch aggressiveness by increasing distance and/or degree). Additional policy setting circuits may be provided between policy 2 setting circuit 588 and policy n setting circuit 570 according to the number of hardware pre-fetchers acting on L1 cache 214. While policy setting circuits 586, 588, 570 are all shown receiving signal 360*a*, different policy setting circuits may use different cache information (e.g. different performance metrics) to determine respective policies. Output signals 471*a*-471*n* are generated according to selected policies and are sent to corresponding selectors 590*a*, 590*b* . . . 590*n* in arbiter 482. Output signals 471*a*, 471*b* . . . 471*n* may include values indicating changes in caching policies for corresponding hardware pre-fetchers (e.g. changes in distance and/or degree) or otherwise indicate changes in aggressiveness or other parameters for corresponding hardware pre-fetchers to apply to L1 cache 214.

System adaptation circuit 478 provides output signals 479*a*, 479*b* . . . 479*n* to selectors 590*a*, 590*b* . . . 590*n* respectively in arbiter 482. Output signals 479*a*, 479*b* . . . 479*n* may be the same (e.g. indicating system-wide changes in aggressiveness or other parameters based on overall utilization in multi-level cache storage 126) or may be specific to individual hardware pre-fetchers (e.g. based on characteristics of particular pre-fetching schemes and/or utilization of specific resources). Selector 590*a* compares output signal 471*a* from policy 1 setting circuit and output signal 479*a* from system adaptation circuit 478 and selects one of these output signals as output 362*a*, which is sent to hardware pre-fetcher HWPF 1.

In general, because L1 program adaptation circuit 470 and system adaptation circuit 478 are focused on different metrics (e.g. pre-fetch accuracy and system utilization) they may indicate different caching policies (e.g. different changes to aggressiveness) in output signals 471 and 479 respectively. Arbiter 482 resolves these differences by selecting appropriate caching policies. In this example, selectors 590*a*, 590*b* . . . 590*n* select the minimum value from values provided by L1 program adaptation circuit 470 and system adaptation circuit 478 (e.g. select whichever aggressiveness is lower and/or minimum distance and/or degree, or whichever change in policy is less) for each policy (for each corresponding hardware pre-fetcher). In other examples, different policies may be combined differently (e.g. by averaging, weighted averaging, or applying some other combination). Thus, in this example, selector 590*b* compares output signal 471*b* from policy 2 setting circuit and output signal 479*b* from system adaptation circuit 478 and generates output 362*b*, which is sent to hardware pre-fetcher HWPF 2. Selector 590*n* compares output signal 471*n* from policy n setting circuit and output signal 479*n* from system adaptation circuit 478 and generates output 362*n*, which is sent to hardware pre-fetcher HWPF n. Outputs 362*a* to 362*n* from selectors 590*a*, 590*b* . . . 590*n* form control signals 362, which are sent to hardware pre-fetchers 252 as illustrated in FIG. 4. Thus, each hardware pre-fetcher HWPF 1 to HWPF n receives a signal indicating a corresponding pre-fetching policy (or change in policy) for L1 cache that is based on both pre-fetching accuracy (or other pre-fetching metric) and system utilization. Pre-fetching policies for other caches may be similarly dynamically updated.

According to an example implementation of the present technology, three hardware pre-fetchers may be used to apply three different pre-fetching schemes to multi-level cache storage 126 (e.g. n=3 in FIGS. 3-5). While any number of hardware pre-fetchers may be used, and hardware pre-fetchers may apply any pre-fetch scheme, the three pre-fetch schemes described here may provide benefits of different pre-fetch schemes (e.g. adaptability to a range of different access patterns) without excessive complexity. In other examples, other pre-fetch schemes may be used and different numbers of pre-fetchers with different schemes may be used.

A first hardware pre-fetcher (e.g. HWPF 1) may be a Multi-Offset Pre-fetcher (MOP) and the first pre-fetching scheme may be a MOP scheme with pre-fetch policy set by policy 1 setting circuit 586 (policy 1 setting circuit 586 may change MOP policy to be implemented by HWPF 1). An MOP (e.g. HWPF 1 in this example) learns memory access patterns of individual load and store addresses. For instance, when a memory reference originates from a load or store within a loop, the addresses from the load or store can follow a simple/regular increasing or decreasing pattern. Such pattern will have a fixed memory stride, where the stride is the difference between the current and previous memory access requests of the same load or store instruction.

The MOP pre-fetcher detects load and store instructions with such patterns. Once enough confidence has been built observing this behavior, it will predict the address locations that are likely to be requested in the future. The MOP builds confidence by counting the number of times it has seen the same load/store instruction with the same stride value.

An MOP may have a structure called a Pattern History Table (PHT) to keep track of individual load or store. Each load or store may index into PHT, check its stride value against the previous stride, and increment its confidence counter if it matches. When an incoming request does not match any of current tracks, it will allocate a new entry or replace an existing one.

A "pattern" may be defined to be a given stride and confidence counter pair. Each PHT entry can record up to two stride-counter pairs in an example (more than two pairs in other examples), hence the name "Multi-Offset". Two offsets or strides correspond to global and local stride values. The last global address is the last address seen by MOP when it tries to look up PHT entries and its difference with the current address is the global stride/delta. Last address is kept per PHT entry. The difference between the current address and the previous address of a PHT entry is the local stride/delta. The local stride may be the difference between load/store addresses in the program order.

When the confidence counter in a PHT entry has reached a threshold value, the PHT entry is read out and transferred to a 1-entry MOP Pattern Generation Table (PGT) which then adds the stride value captured in the pattern to the current memory address for the load/store and creates a new speculative memory address. This speculative memory address is the Hardware Pre-fetch Address, and it is enqueued to a Pre-Fetch Buffer (PFB). Once it reaches the head of the PFB, it arbitrates with demand requests coming from a Request ScoreBoard (RSB). MOP may generate pre-fetch requests for different cache levels up to a maximum degree.

A second hardware pre-fetcher (e.g. HWPF 2) may be a Spatial Memory Streaming (SMS) pre-fetcher and the second pre-fetching scheme may be a SMS scheme with pre-fetch policy set by policy 2 setting circuit 588 (policy 2 setting circuit 588 may change SMS policy to be implemented by HWPF 2). While MOP exploits simple streams with fixed strides of load or store instructions, SMS exploits more complex patterns resulting from spatial correlation within a fixed-size portion of memory space.

A memory reference that originates from a load/store might not have a fixed stride or address offset from the previous memory reference. However, when observed over time, it may be highly correlated with references to other nearby memory locations. For a given load or store instruction in the hardware pre-fetch engine, SMS captures the spatial locality of memory references that span over a "region" of interest or window of 1 KB size using a Pattern Training Table (PTT). Every demand may access the PTT by either a hashed PC or physical address of the region. The PTT tracks up to a predetermined number of entries (e.g. 8 entries), where each entry tracks, for example, 16 cache line accesses within a 1 KB region (64B cache line). If a load or store that has been tracked steps into a new region, it may be uploaded to the 4-entry SMS PGT. This PGT may require a minimum number of lines to be accessed within the 1 KB region to accept an upload in addition to having at least one cache miss. The SMS pre-fetcher may generate pre-fetch requests for the new region that have the same relative offset to the first access in the old region.

A third hardware pre-fetcher (e.g. HWPF n) may be an Enhanced Next-line Pre-fetcher (ENP) and the third pre-fetching scheme may be an ENP scheme with pre-fetch policy set by policy n setting circuit 570 (policy n setting circuit 570 may change ENP policy to be implemented by HWPF n). HWPF n may be configured to pre-fetch more than one cache line ahead (e.g. enhanced to pre-fetch up to three cache lines ahead in one example, more than three lines in other examples). Its degree may be controlled by the L1 adaptive policy sent by output 362n. The ENP may not require any training (e.g. may not require training as MOP and SMS do). The ENP sends pre-fetch requests for a demand miss from a load instruction into cache (e.g. L1 cache). The aggressiveness may be based on the pre-fetcher accuracy. When pre-fetcher accuracy is set to 0, ENP may be disabled. Up to 2 entries can allocate into ENP PGT per cycle in this example. The ENP PGT entry may stop and deallocate if it crosses the page boundary of the load which allocated the entry. When ENP PGT has no slots available, it may drop the upload and when it has one available slot, the latest address may be uploaded. ENP PGT may eliminate the second upload if it is for the same load miss address to avoid duplicate pre-fetch requests.

All pre-fetch generators can be simultaneously active (MOP, SMS, ENP). The ENP PGTs may have the highest priority, followed by round-robin arbitration between the SMS PGT and MOP PGT. Up to two different PGTs can enqueue to the PFB per cycle.

Figure 6:
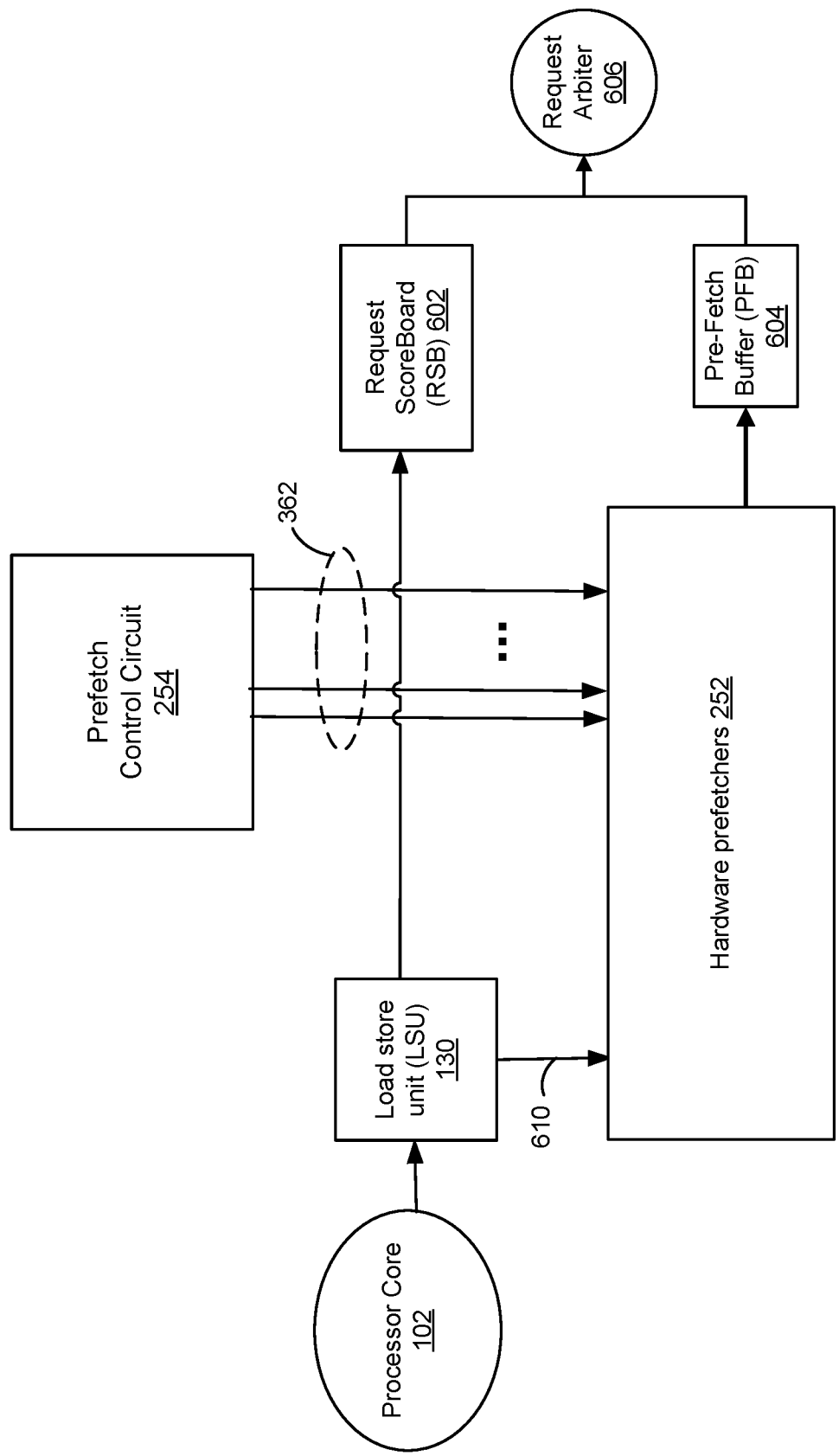
FIG. 6 depicts one embodiment of a memory system that includes hardware pre-fetchers and a pre-fetch control circuit.

FIG. 6 shows an example implementation including connection of pre-fetch control circuit 254 and hardware pre-fetchers 252 with other components of memory system 105. Load store unit (LSU) 130 is connected to receive input 601 which includes demands (e.g. from processor core 102, or some component of processor core 102) for execution in this example. In some examples, LSU 130 may be partially or entirely implemented in processor core 102 so that such requests may come from another component of processor core 102. LSU 130 sends requests via demand lookup output 610 to train hardware pre-fetchers 252 in addition to sending requests to Request ScoreBoard (RSB) 602 to be sent to arbiter 606. Requests from hardware pre-fetchers 252 (e.g. pre-fetch addresses) are sent to pre-fetch buffer (PFB) 604. Arbiter 606 arbitrates between requests in RSB 602 and requests in PFB 604 and sends requests for execution (e.g. sends requests to a cache of multi-level cache storage 126). There may be filters (not shown) between hardware pre-fetchers 252 and PFB 604 to avoid sending identical pre-fetch requests from different hardware pre-fetchers to PFB 604. To further reduce redundancy, entries in PFB 604 and entries in RSB 602 may be cross checked before sending to the arbiter 606.

Different pre-fetch schemes may be adjusted in different ways based on changes in one or more performance metric according to the present technology. In an embodiment, degree and distance are separately adjusted by a policy setting circuit. A cache may have a bit or bits stored in each line indicating if it is a pre-fetched line. If a pre-fetch bit is set it means the corresponding line has been pre-fetched, and the cache line is accessed (before being displaced), the pre-fetch has been good/useful and a "good counter" may be incremented followed by a pre-fetch bit reset. If the line is being displaced/evicted while a pre-fetch bit is set, the pre-fetch has been useless/bad and a "bad pre-fetch counter" may be incremented. Good/bad pre-fetch count is one of the performance metrics that may be used when changing pre-fetch policy. Another counter is the total pre-fetch sent by each pre-fetcher. Cache pre-fetch related counters may be collected and maintained per pre-fetcher type. The performance metrics used for adjusting the degree may include accuracy and accuracy_based as defined in the following equations:

$$\text{accuracy} = \frac{\text{good prefetch}}{\text{total prefetch requests}} \qquad \text{Equation 1}$$

$$\text{accuracy\_based} = \frac{\text{good prefetch}}{\text{bad prefetch}} \qquad \text{Equation 2}$$

In an example, in every sampling interval, in addition to degree, distance may be evaluated and adjusted. The PFB 604 stores hardware pre-fetch requests to allow the RSB to handle demand requests. If there is no existing PFB entry to the same address, pre-fetch requests are enqueued into the PFB to await arbitration into cache (e.g. L2 cache). Pre-fetch requests have a lower priority than any other requests and will be chosen only if there are no other demand requests waiting. When chosen, the pre-fetch request will be compared against in flight requests in the RSB and will be dropped if the line has already been requested. The ratio of pre-fetch demands that hit in RSB to the total demand count may be kept in a counter and evaluated for each pre-fetcher separately. It may be obtained for different pre-fetchers at different times (e.g. for ENP when sending pre-fetch requests to L1 and for MOP and SMS send pre-fetch requests to L2). Tables 1A and 1 B illustrate adaptive throttling or change in aggressiveness (including both degree and distance) in L1 cache and L2 cache respectively according to a gain score (e.g. a measured change in a performance metric between sampling intervals).

TABLE 1A (L1)

| | Degree | | | Distance | |
|---|---|---|---|---|---|
| Score | Throttling | MOP | ENP | MOP | ENP |
| <0 | down | +score −1 | >>1 | N/A | >>1 |
| >0 | up | +score −1 | +1 | N/A | +2 |

TABLE 1B (L2)

| | Degree | | | Distance | | |
|---|---|---|---|---|---|---|
| Score | Throttling | MOP | SMS | Score | MOP | SMS |
| <0 | down | +score | −1 | <0 | >>1 | >>1 |
| >0 | up | +score | +1 | >0 | Score +2 | +1 |

Other counters that MOP and SMS may use for adjusting distance are pre-fetch requests that hit and miss in L2 and which were sent as a pre-fetch request to L1 or L2 (and are referred to as pfl2_hitl2 and pfl2_missl2). If the number of L2 pre-fetches that hits L2 is greater than the number of L2 misses, it means that the number of late pre-fetch requests is increasing and increasing the distance could be helpful.

The total L2 distance score for either MOP or SMS may have the following components.
  Ratio of demands that hit the RSB to the total demands. (The goal may be to reduce this value.)
  Ratio of pre-fetch requests that hit in L2 to pre-fetch requests that miss in L2.
  Assigning an automatic negative score if pre-fetch degree is decreasing.
  If the total distance score is negative, the distance will be decreased and if the score is positive, the distance will be increased until it reaches a maximum value.

Pre-fetcher performance (e.g. MOP, SMS, and ENP performance) may be evaluated by assigning performance metrics of each pre-fetch scheme a degree score. The input to the score function may be the current and previous value of the metric and a counter. The output may be a metric score based on observed gain (Table 2 is an example of a score function). Score for each performance metric ranges from −4, −2, −1, 0, 1, 2, and 4. If more than one performance metric is used, the final score will be the sum of the scores of all metrics. Score sign indicates the degree throttling direction for each pre-fetcher.

TABLE 2

| Conditions | Gain | Score |
|---|---|---|
| previous value = 0 | | 2 |
| Value = 0 | | −2 |
| Value > previous value | >=2.00 | 2 |
| | >=1.50 | 1 |
| | >=1.25 | counter +2 |
| | other | counter +1 |

TABLE 2-continued

| Conditions | Gain | Score |
|---|---|---|
| Value < previous value | <=0.5 | 4 |
| | <=0.75 | 2 |
| | <=0.50 | counter −2 |
| | other | counter −1 |
| counter > 4 & score is not set | | 1 |
| counter < 0 & score is not set | | −1 |

Table 3 is a summary of which pre-fetchers may be controlled by the L1 and L2 adaptive functions. Note that MOP is the only pre-fetcher sending requests to L1, L2 and L3 caches in this example. ENP only pre-fetches for L1 cache and SMS only requests pre-fetch for L2 cache in this example.

TABLE 3

| | Degree | | | Distance | | |
|---|---|---|---|---|---|---|
| L1 Adaptive | ENP | MOP | — | ENP | — | — |
| L2 Adaptive | — | MOP | SMS | — | MOP | SMS |

MOP and ENP may generate pre-fetch for L1 cache and may each have a policy that at the end of the L1 cache adaptive interval will determine the aggressiveness state (degree and distance) of each pre-fetcher.

Three statistics counters may be used for ENP pre-fetches. One counter is for good pre-fetch count and one is for bad pre-fetch count (the lines that were brought into L1 cache and got evicted before having been accessed). This metric is defined as the ratio of good to bad pre-fetch. Another counter is total number of pre-fetch requests sent. The second metric is defined as the ratio of good pre-fetch count to total pre-fetch requests sent or accuracy. ENP accuracy is monitored and if it gets close to zero, a wait counter is initiated and the ENP degree is increased (e.g. incremented by 1). The score functions may take in the previous and current value of the two metrics and assign a score based on the gain. The overall score may be the sum of the two individual scores. Table 1A shows how ENP degree may be adjusted. When the degree increases, the distance may be increased only if number of pre-fetch requests that hit RSB is greater than predetermined threshold value (e.g. 40) in which case the distance becomes distance +2. And if the degree is being decreased or pre-fetch requests that hit RSB is less than the threshold, distance will be divided by 2.

A counter may be used to track how long ENP is inactive for L1 cache and none of its pre-fetch requests are accepted by the PFB. This may prevent ENP from staying stagnant and may reactivate it to avoid stagnation.

Equation 2 above may be used a performance metric for MOP and may be the only performance metric in some examples. When adjusting the degree, the throttling direction may be followed by adding (e.g. 1+/−score) to the current degree.

MOP and SMS pre-fetchers may generate pre-fetch requests for L2 cache and use accuracy (e.g. Equation 1) as a performance metric for changing the degree. A score function that may be used for L2 cache may be similar to what is shown in Table 1 B. However, the distance throttling may use 3 different distance metrics, for example, pre-fetches that hit RSB, pre-fetches that hit or miss in L2 cache, whether degree is increasing or decreasing, and distance score when decreasing. The overall distance score may be the sum of the 3 scores and based on the score sign distance is throttled for both SMS and MOP. As a quick reference, Table 4 summarizes simultaneous adjustment of degree and distance.

TABLE 4

| Degree | | | | Distance | | |
|---|---|---|---|---|---|---|
| Score | Throttling | MOP | SMS | Score | MOP | SMS |
| <0 | down | +score | +1 | <0 | >>1 | >>1 |
| >0 | up | +score | −1 | >0 | score +2 | +1 |

Figure 7:
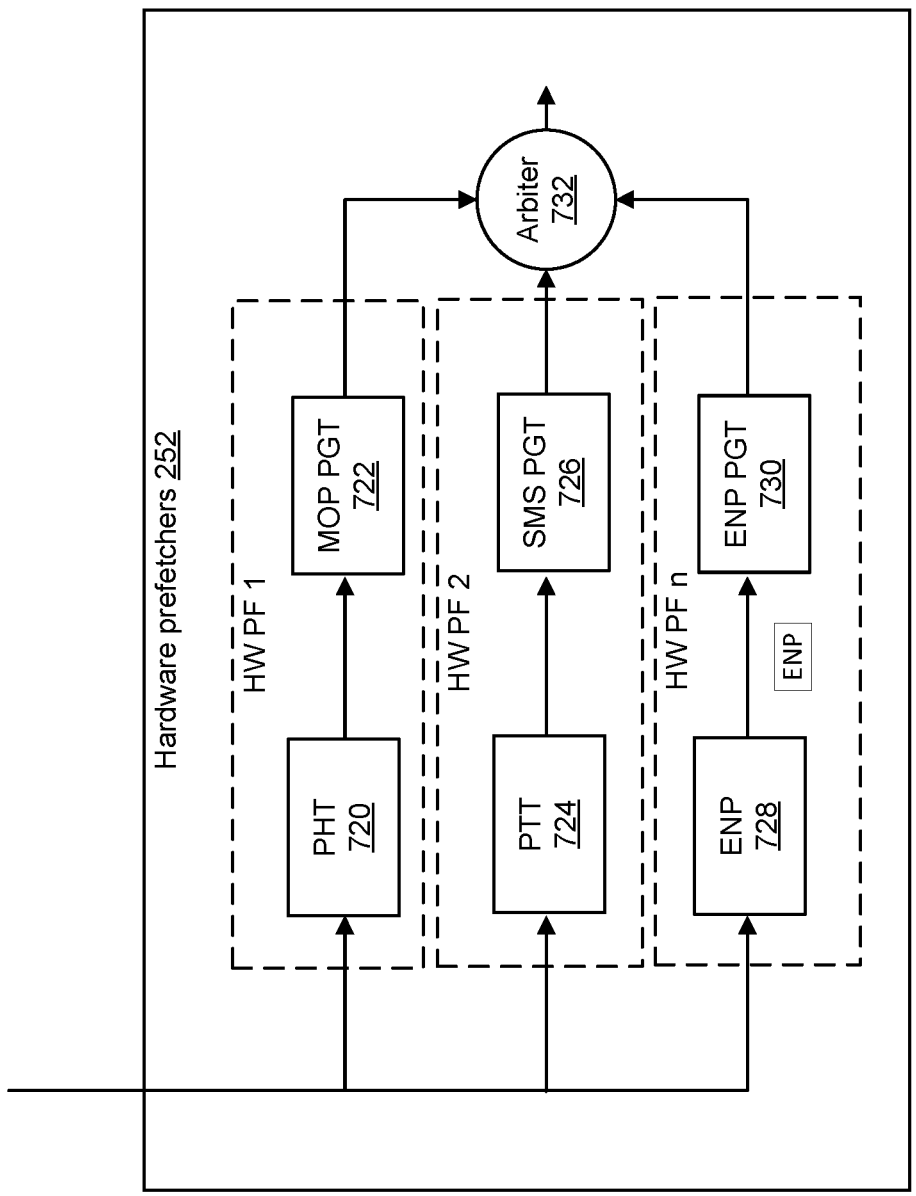
FIG. 7 depicts one embodiment of hardware pre-fetchers.

FIG. 7 shows an example of hardware pre-fetchers 252 implemented as previously discussed, with HWPF 1 configured as an MOP, HWPF 2 configured as an SMS pre-fetcher, and HWPF n configured as an ENP to capture different memory access patterns. Hardware pre-fetchers 252 may observe the address traffic from LSU 130 load and store demand request pipeline to cacheable memory (e.g. between LSU 130 and RSB 602 as indicated by demand lookup output 610 from LSU 130) and may be trained to predict future requests. HWPF 1, configured as a MOP captures one delta per pattern using a Pattern History Table or PHT 720. HWPF 2 configured as an SMS pre-fetcher tracks one or more region (e.g. 1 KB region) in its Pattern Training Table or PTT 724 and streams pre-fetch requests. HWPF n configured as an ENP simply sends pre-fetch requests for the following lines and unlike MOP or SMS does not require any training or separate table so that in this configuration, table 728 of HWPF n may be unused. Hardware pre-fetchers may be reconfigured to apply different pre-fetch schemes so that, for example, if HWPF n was reconfigured as an MOP then table 728 could be configured as a PHT.

Confidence levels may be maintained for each hardware pre-fetch engine, HWPF 1 to n, and may be adjusted dynamically based on measurements taken on how effectively the hardware pre-fetch engine is pre-fetching data. Effective pre-fetch requests that result in a cache hit raise the confidence, and ineffective pre-fetch requests lower it. High confidence translates into more pre-fetch activity for the engine. Low confidence may mean that the engine has abandoned pre-fetching the ongoing pattern and is starting a new one. Once enough confidence has been established and an address pattern has been "learned", the pattern is uploaded to the Pattern Generation Table (PGT), which may be stored in a suitable location (e.g. stored in L2 cache). A PGT generates a series of requests to a corresponding cache for addresses which are likely to be required by future load and store demand requests. If there is a miss in higher level cache (e.g. L1 or L2 cache), the data may be retrieved from lower level cache (e.g. L3 cache) or main memory and allocated in higher level cache (e.g. in L2 cache or in both the L1 and L2 cache).

Each hardware pre-fetcher includes a corresponding PGT. HWPF 1 includes MOP PGT 722, HWPF 2 includes SMS PGT 726, and HWPF n includes ENP PGT 730. PGTs may reside in L2C and may generate pre-fetch requests that are sent to an arbiter 732. ENP PGT of HWPF n may have priority at arbiter 732 and the other two pre-fetchers may send out requests in a round-robin fashion. Note that the limit on how many pre-fetch requests each pre-fetcher can send out or how far ahead it can pre-fetch is set in the pre-fetch control circuit 254.

Figure 8:
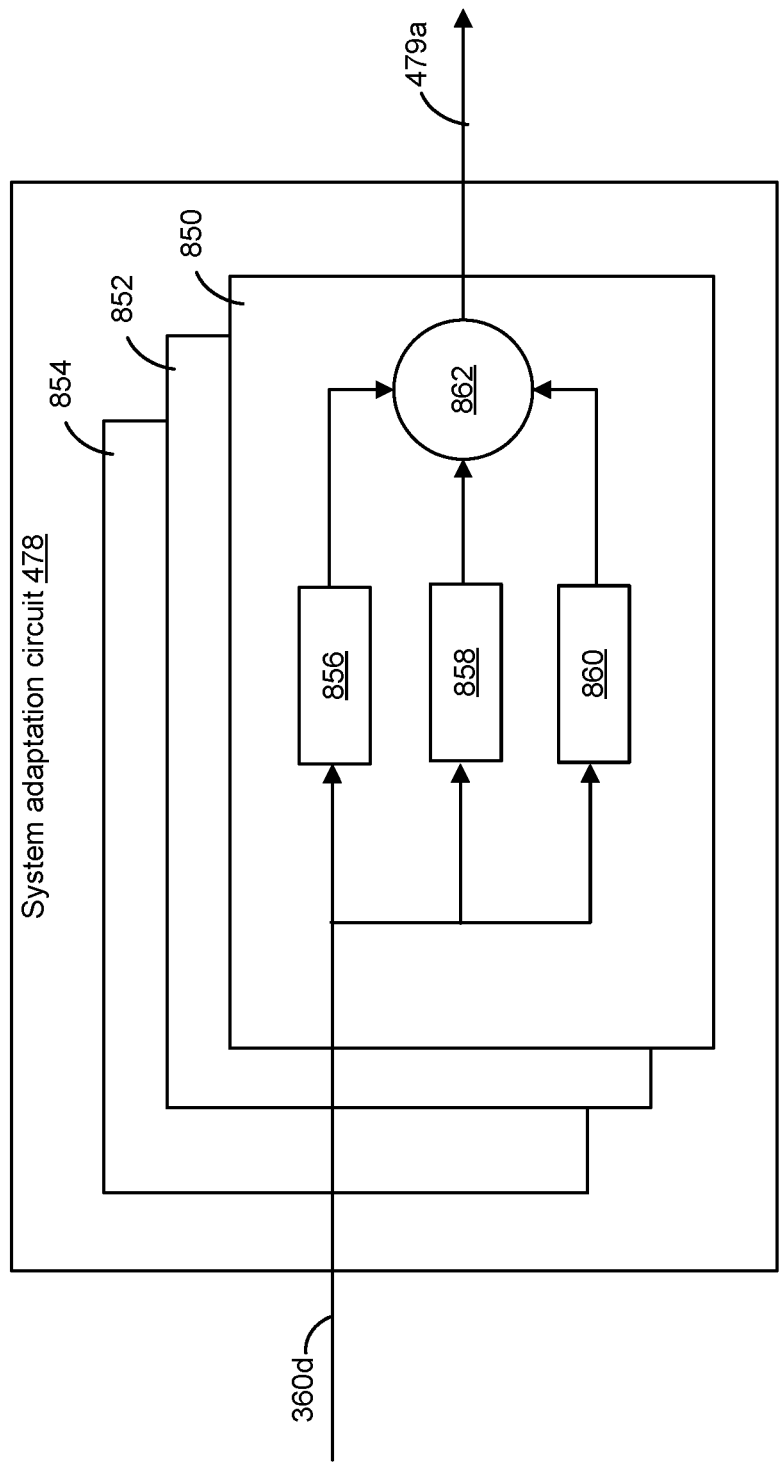
FIG. 8 depicts one embodiment of a system adaptation circuit.

FIG. 8 shows an example of system adaptation circuit 478 configured to implement system adaptation for the three pre-fetch schemes (e.g. as previously described, with HWPF 1 configured as an MOP, HWPF 2 configured as an SMS pre-fetcher, and HWPF n configured as an ENP to capture different memory access patterns). System adaptation circuit 478 includes three system adaptation units 850, 852, 854 corresponding to the three pre-fetch schemes implemented by these three hardware pre-fetchers (in other examples, different numbers of system adaptation units may be provided, e.g. in a one-to-one correspondence to hardware pre-fetchers). System adaptation unit 850 is configured to generate output signal 479a, which is combined with output signal 471a by selector 590a to generates output 362a to hardware pre-fetcher HWPF 1 (e.g. configured as an MOP) as previously illustrated. System adaptation unit 850 is configured to generate output signal 479a to indicate an appropriate policy (or policy change) for a corresponding hardware pre-fetcher (e.g. MOP policy, or policy change, for HWPF 1) based on utilization parameters obtained from signal 360d. Different parameters may be extracted from signal 360d (in other examples, dedicated signals may be provided for different parameters) and may be separately evaluated to obtain a suitable policy. Evaluation unit 856 may be directed to first parameters, for example L2 cache parameters (e.g. occupancy) and may extract L2 cache data from signal 360d and, based on such parameters or changes in parameters, may generate an indicator of suitable pre-fetch policy (e.g. changing MOP policy to be more or less aggressive as L2 cache occupancy decreases or increases). Evaluation unit 858 may be directed to second parameters, for example L3 cache parameters and may extract L3 cache data from signal 360d and, based on such parameters or changes in parameters, may generate an indicator of suitable pre-fetch policy (e.g. changing MOP policy to be more or less aggressive as L3 cache occupancy decreases or increases). Evaluation unit 860 may be directed to third parameters, for example bus parameters associated with a bus (e.g. DDR bus) and/or bus controller (e.g. DDR bus controller) and, based on such parameters or changes in parameters, may generate an indicator of suitable pre-fetch policy (e.g. changing MOP policy to be more or less aggressive as bus and/or bus controller utilization decreases or increases). Indicators from evaluation units 856, 858, 860 are sent to selector 862, which selects an indicator to provide in output signal 479a. For example, selector 862 may select an indicator which indicates the minimum aggressiveness or the minimum change in aggressiveness of the three indicators. In other examples, more than three different indicators may be provided based on different parameters. Other selection may be used to select an indicator for output signal 479a (e.g. averaging, weighted averaging, or some other combination).

System adaptation units 852 and 854 may be configured with evaluation units similar to those of system adaptation unit 850. Different parameters may be evaluated, and different evaluation criteria may be used in different system adaptation units according to a corresponding pre-fetch policy. The number of system adaptation units may be equal to the number of hardware pre-fetchers (e.g. n in the example of FIG. 5) or may be different (e.g. a system adaptation unit may generate an aggressiveness indicator for more than one hardware pre-fetcher).

It will be understood that the examples described above are for illustration and that aspects of the present technology may be implemented in many different ways. For example, various performance metrics may be used to evaluate pre-fetching. In addition to, or instead of using pre-fetch accuracy, one or more other performance metric may be used with a respective score assigned. For example, one or more performance metric such as pre-fetch coverage, pre-fetch lateness, demand hit rate or demand hit pre-fetch rate could be used instead of pre-fetch accuracy, or a combination of two or more performance metrics may be used. The overall performance score may be the sum of the individual scores based on different performance metrics (or may be an average, mean, median, or other value that is obtained from combining individual performance metrics). Examples of performance metrics and their definitions are provided in Equations 3-6:

$$\text{prefetch efficiency} = \frac{\text{Useful prefetch}}{\text{PFB accepted prefetch}} \qquad \text{Equation 3}$$

$$\text{prefetch coverage} = \frac{\text{useful prefetch}}{\text{useful prefetch} + \text{demand misses}} \qquad \text{Equation 4}$$

$$\text{prefetch lateness} = \frac{\text{late prefetch}}{\text{Useful prefetch}} \qquad \text{Equation 5}$$

$$\text{demand hit rate} = \frac{\text{demand hit } pf\ cnt + \text{datacache hit } cnt}{\text{datacache access } cnt} \qquad \text{Equation 6}$$

In an example, different hardware pre-fetchers may be used. For example, detection of common application patterns such as simple delta patterns, regional, and next-line pre-fetching may be performed by appropriate hardware pre-fetchers. A complex multi-offset pre-fetcher that supports multiple delta patterns can be added by simply leveraging the existing hardware structures of an MOP. This may reduce extra hardware costs for adding an entirely different pre-fetcher and may add more coverage by the pre-fetch engine. An MOP may be modified to keep track of an additional simple stream. This may require minimal hardware changes for additional detection coverage. The arbitration between the two or more such streams (e.g. from two or more pattern generators, or PGENs) may be round-robin. In addition, other pre-fetchers such a sequential pre-fetcher or multi-stride pre-fetcher could be added or substituted for one or more of the pre-fetchers described above. The communication channels between the pre-fetch control circuit and the hardware pre-fetchers may remain the same. The corresponding performance metrics may still be transferred to the pre-fetch control circuit for the aggressiveness level to be determined.

In an example, metrics which contain more information about the history of the performance metric counter may be used. For example, instead of resetting a counter, a fraction of the value from one or more earlier sampling interval may be kept as it starts counting for the new sampling interval.

The technology described herein can be implemented using hardware, software, or a combination of both hardware and software. The software used is stored on one or more of the processor readable storage devices described above to program one or more of the processors to perform the functions described herein. The processor readable storage devices can include computer readable media such as volatile and non-volatile media, removable and non-removable media. By way of example, and not limitation, computer readable media may comprise computer readable storage media and communication media. Computer readable storage media may be implemented in any method or technology for storage of information such as computer readable instructions, data structures, program modules or other data. Examples of computer readable storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by a computer. A computer readable medium or media does (do) not include propagated, modulated or transitory signals.

Communication media typically embodies computer readable instructions, data structures, program modules or other data in a propagated, modulated or transitory data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as RF and other wireless media. Combinations of any of the above are also included within the scope of computer readable media.

In alternative embodiments, some or all of the software can be replaced by dedicated hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), special purpose computers, etc. In one embodiment, software (stored on a storage device) implementing one or more embodiments is used to program one or more processors. The one or more processors can be in communication with one or more computer readable media/storage devices, peripherals and/or communication interfaces.

It is understood that the present subject matter may be embodied in many different forms and should not be construed as being limited to the embodiments set forth herein. Rather, these embodiments are provided so that this subject matter will be thorough and complete and will fully convey the disclosure to those skilled in the art. Indeed, the subject matter is intended to cover alternatives, modifications and equivalents of these embodiments, which are included within the scope and spirit of the subject matter as defined by the appended claims. Furthermore, in the following detailed description of the present subject matter, numerous specific details are set forth in order to provide a thorough understanding of the present subject matter. However, it will be clear to those of ordinary skill in the art that the present subject matter may be practiced without such specific details.

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

For purposes of this document, each process associated with the disclosed technology may be performed continuously and by one or more computing devices. Each step in a process may be performed by the same or different computing devices as those used in other steps, and each step need not necessarily be performed by a single computing device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
   operating a plurality of hardware pre-fetchers to pre-fetch data in a memory hierarchy that includes a main memory and two or more caches between the main memory and a processor core, each hardware pre-fetcher coupled to each of the two or more caches to apply a different pre-fetching scheme to the two or more caches;
   arbitrating requests from each of the plurality of hardware pre-fetchers;
   buffering pre-fetch requests from each of the plurality of hardware pre-fetchers in a buffer;
   calculating changes in one or more performance metrics over two or more sampling intervals; and
   controlling the plurality of hardware pre-fetchers in response to a change in the one or more performance metrics between at least a first sampling interval and a second sampling interval.

2. The method of claim 1 wherein the change in the one or more performance metrics includes a change in pre-fetch accuracy between at least the first sampling interval and the second sampling interval.

3. The method of claim 1, wherein controlling the plurality of hardware pre-fetchers in response to a change in the one or more performance metrics includes reducing aggressiveness of a hardware pre-fetcher in response to a reduction in pre-fetch accuracy from the first sampling interval to the second sampling interval.

4. The method of claim 3, further comprising controlling the plurality of hardware pre-fetchers in response to a detected level of system utilization including reducing aggressiveness of the hardware pre-fetcher in response to high system utilization.

5. The method of claim 3, wherein reducing aggressiveness of the hardware pre-fetcher includes reducing at least one of degree or distance used by the hardware pre-fetcher.

6. The method of claim 1 further comprising:
   sending a first control signal to a first hardware pre-fetcher of the plurality of hardware pre-fetchers;
   sending a second control signal to a second hardware pre-fetcher of the plurality of hardware pre-fetchers; and
   sending a third control signal to a third hardware pre-fetcher of the plurality of hardware pre-fetchers.

7. The method of claim 6 wherein the first hardware pre-fetcher is a Multi-Offset Pre-fetcher (MOP), the second hardware pre-fetcher is a Spatial Memory Streaming (SMS) pre-fetcher, and the third hardware pre-fetcher is an Enhanced Next-line Pre-fetcher (ENP).

8. The method of claim 1 further comprising:
   counting evictions from a cache of the memory hierarchy, the first and second sampling intervals defined by a predetermined number of evictions from the cache.

9. The method of claim 1 wherein the one or more caches between the main memory and the processor core include a Level 1 (L1) cache and a Level 2 (L2) cache, and calculating changes in one or more performance metrics includes calculating a first change in a performance metric for the L1 cache and calculating a second change in the performance metric for the L2 cache.

10. An apparatus comprising:
    a processor core;
    a memory hierarchy comprising main memory and two or more caches between the main memory and the processor core;
    a plurality of hardware pre-fetchers, each hardware pre-fetcher coupled to each of the two or more caches of the memory hierarchy, each hardware pre-fetcher configured to apply a different pre-fetching scheme to the two or more caches of the memory hierarchy;
    an arbiter coupled to the plurality of hardware pre-fetchers to arbitrate requests from each of the plurality of hardware pre-fetchers;
    a buffer coupled to the plurality of hardware pre-fetchers through the arbiter to enqueue pre-fetch requests from each of the plurality of hardware pre-fetchers; and
    a pre-fetch control circuit coupled to the plurality of hardware pre-fetchers, the pre-fetch control circuit configured to measure changes in one or more cache performance metrics over two or more sampling intervals and to control operation of the plurality of hardware pre-fetchers in response to a change in one or more performance metrics between at least a first sampling interval and a second sampling interval.

11. The apparatus of claim 10, wherein the change in the one or more performance metrics includes detecting a change in pre-fetch accuracy between at least the first sampling interval and the second sampling interval.

12. The apparatus of claim 10, wherein the pre-fetch control circuit is configured to reduce aggressiveness of a hardware pre-fetcher in response to a reduction in pre-fetch accuracy from the first sampling interval to the second sampling interval.

13. The apparatus of claim 12 wherein the pre-fetch control circuit is further configured to control operation of the plurality of hardware pre-fetchers in response to a detected level of system utilization, the pre-fetch control circuit configured to reduce aggressiveness of the hardware pre-fetcher in response to high system utilization.

14. The apparatus of claim 12, wherein the pre-fetch control circuit is configured to reduce aggressiveness of the hardware pre-fetcher by reducing at least one of degree or distance used by the hardware pre-fetcher.

15. The apparatus of claim 10, wherein the plurality of hardware pre-fetchers includes a first hardware pre-fetcher, a second hardware pre-fetcher and a third hardware pre-fetcher, each connected to receive a separate control signal from the pre-fetch control circuit.

16. The apparatus of claim 15, wherein the first hardware pre-fetcher is a Multi-Offset Pre-fetcher (MOP), the second hardware pre-fetcher is a Spatial Memory Streaming (SMS) pre-fetcher, and the third hardware pre-fetcher is an Enhanced Next-line Pre-fetcher (ENP).

17. The apparatus of claim 10, wherein the first and second sampling intervals are each defined by a predetermined number of evictions in a corresponding cache.

18. The apparatus of claim 10, wherein the one or more caches between the main memory and the processor core include a Level 1 (L1) cache and a Level 2 (L2) cache, each of the plurality of hardware pre-fetchers operating separately on L1 cache and L2 cache according to separate performance metrics and separate sampling intervals.

19. The apparatus of claim 10, wherein the plurality of hardware pre-fetchers includes a Multi-Offset Prefetcher (MOP).

20. The apparatus of claim 10, wherein the plurality of hardware pre-fetchers includes a Spatial Memory Streaming (SMS) pre-fetcher.

21. The apparatus of claim 10, wherein the plurality of hardware pre-fetchers includes an Enhanced Next-line Pre-fetcher (ENP).

22. A computer system comprising:
a processor core;
a memory hierarchy comprising main memory and at least a first cache and a second cache between the main memory and the processor core;
a plurality of hardware pre-fetchers, each hardware pre-fetcher coupled to the first cache and the second cache of the memory hierarchy, each hardware pre-fetcher configured to apply a different pre-fetching scheme to the two or more caches of the memory hierarchy;
an arbiter coupled to the plurality of hardware pre-fetchers to arbitrate requests from each of the plurality of hardware pre-fetchers;
a buffer coupled to the plurality of hardware pre-fetchers through the arbiter to enqueue pre-fetch requests from each of the plurality of hardware pre-fetchers; and
a pre-fetch control circuit coupled to the plurality of hardware pre-fetchers, the pre-fetch control circuit configured to calculate changes in pre-fetch accuracy of the first cache and the second cache over two or more sampling intervals and control aggressiveness of the plurality of hardware pre-fetchers in response to changes in pre-fetch accuracy of a corresponding cache between at least a first sampling interval and a second sampling interval of the corresponding cache.

23. The computer system of claim 22, wherein the pre-fetch control circuit is configured to reduce aggressiveness of a hardware pre-fetcher in response to a reduction in pre-fetch accuracy from the first sampling interval to the second sampling interval and to increase aggressiveness of the hardware pre-fetcher in response to an increase in pre-fetch accuracy of the hardware pre-fetcher from the first sampling interval to the second sampling interval.

24. The computer system of claim 22, wherein the plurality of hardware pre-fetchers includes a Multi-Offset Prefetcher (MOP).

25. The computer system of claim 22, wherein the plurality of hardware pre-fetchers includes a Spatial Memory Streaming (SMS) pre-fetcher.

26. The computer system of claim 22, wherein the plurality of hardware pre-fetchers includes an Enhanced Next-line Pre-fetcher (ENP).

27. The computer system of claim 22, wherein the plurality of hardware pre-fetchers includes a Multi-Offset Prefetcher (MOP), a Spatial Memory Streaming (SMS) pre-fetcher and an Enhanced Next-line Pre-fetcher (ENP).

* * * * *